US012636801B2

(12) United States Patent
Duey et al.

(10) Patent No.: US 12,636,801 B2
(45) Date of Patent: May 26, 2026

(54) VERTICALLY ORIENTED CURVED LINER SPRING FOR KNIFE HANDLE

(71) Applicant: Benchmade Knife Co., Inc., Oregon City, OR (US)

(72) Inventors: Wes Duey, Oregon City, OR (US); Robert Horacek, Park City, UT (US); James Dobbs, Milwaukie, OR (US); Austin Nelson, Portland, OR (US); Nate Radcliffe, Lake Oswego, OR (US); Peter Groat, Molalla, OR (US)

(73) Assignee: Benchmade Knife Co., Inc., Oregon City, OR (US)

( * ) Notice: Subject to any disclaimer, the term of this patent is extended or adjusted under 35 U.S.C. 154(b) by 308 days.

(21) Appl. No.: 18/225,646

(22) Filed: Jul. 24, 2023

(65) Prior Publication Data

US 2024/0033952 A1 Feb. 1, 2024

Related U.S. Application Data

(60) Provisional application No. 63/393,099, filed on Jul. 28, 2022.

(51) Int. Cl.
*B26B 1/04* (2006.01)

(52) U.S. Cl.
CPC .............. *B26B 1/048* (2013.01); *B26B 1/042* (2013.01)

(58) Field of Classification Search
CPC .. B26B 1/00; B26B 1/04; B26B 1/042; B26B 1/048; B26B 1/06
See application file for complete search history.

(56) References Cited

U.S. PATENT DOCUMENTS

| | | | | |
|---|---|---|---|---|
| 5,755,035 A * | 5/1998 | Weatherly | B26B 1/044 | 30/160 |
| 7,059,053 B2 * | 6/2006 | Sakai | B26B 1/048 | 30/160 |

(Continued)

FOREIGN PATENT DOCUMENTS

| | | |
|---|---|---|
| CN | 201205711 Y | 3/2009 |
| JP | S52-119200 U | 9/1977 |
| TW | 201919835 A | 6/2019 |

OTHER PUBLICATIONS

Int'l Patent Application No. PCT/US2023/028512; Int'l Search Report/Written Opinion; Nov. 15, 2023.

*Primary Examiner* — Boyer D Ashley
*Assistant Examiner* — Richard D Crosby, Jr.
(74) *Attorney, Agent, or Firm* — Schwabe, Williamson & Wyatt, P.C.

(57) ABSTRACT

A liner for a folding knife includes a curved elongated spring to bias a blade of the knife to an open or closed position. The spring may extend in an arc from an origination point to a free end, within a cutout region of a body of the liner. The spring may be J-shaped in one approach. The spring may be integrally formed with the liner or formed as a separate piece which is attached to the liner. The free end may include a shoe to contact a lock stud in a handle of the knife. The origination point may be below and frontward of the shoe. The spring biases the lock stud frontward to lock the blade in the open position. To close the blade, the user moves the lock stud rearward, against a spring force of the spring, allowing the blade to rotate to the closed position.

20 Claims, 26 Drawing Sheets

(56) References Cited

U.S. PATENT DOCUMENTS

| | | | | |
|---|---|---|---|---|
| 7,406,896 | B2 * | 8/2008 | Rivera | B25F 1/003 7/128 |
| 7,748,122 | B2 * | 7/2010 | Duey | B26B 1/048 30/159 |
| 9,492,916 | B2 | 11/2016 | Snyder | |
| 10,661,457 | B2 | 5/2020 | France | |
| 10,695,920 | B2 * | 6/2020 | Bruhns | B26B 1/044 |
| 11,123,884 | B1 * | 9/2021 | Mollick | B26B 1/048 |
| 11,673,280 | B1 | 6/2023 | Randall et al. | |
| 11,820,028 | B2 * | 11/2023 | Makari | B26B 1/044 |
| 12,415,286 | B1 * | 9/2025 | Novak | B26B 1/04 |
| 2003/0070299 | A1 * | 4/2003 | Frazer | B26B 1/048 30/160 |
| 2006/0059694 | A1 | 3/2006 | Carter | |
| 2009/0277015 | A1 * | 11/2009 | Duey | B26B 1/046 30/158 |
| 2010/0212163 | A1 | 8/2010 | Liu | |
| 2013/0283621 | A1 | 10/2013 | Snyder et al. | |
| 2015/0239134 | A1 * | 8/2015 | Duey | B26B 1/06 30/159 |
| 2019/0061181 | A1 | 2/2019 | France | |
| 2021/0197410 | A1 * | 7/2021 | Busse | B26B 1/042 |
| 2022/0410415 | A1 * | 12/2022 | Douglas | B26B 1/048 |

* cited by examiner

| | | Vertical height | | | | | Vertical height | | | | |
|---|---|---|---|---|---|---|---|---|---|---|---|
| | | 0.5 | 0.7 | 0.9 | 1.1 in. | | 0.5 | 0.7 | 0.9 | 1.1 in. | |
| | | 12 | 18 | 23 | 28 mm | | 12 | 18 | 23 | 28 mm | |
| Spring dimensions (th x w) | | Spring constant | | | | | Stress (ksi) | | | | |
| 0.030 x 0.020 | in. | 8.7 | 3.9 | 2.1 | 1.3 | lb/in | 184 | 117 | 80 | 61 | ksi |
| 0.762 x 0.508 | mm | 1523 | 683 | 367 | 227 | N/m | 1268 | 806 | 551 | 420 | MPa |
| 0.040 x 0.025 | in. | 22.3 | 10.1 | 5.3 | 3.3 | lb/in. | 217 | 139 | 97 | 78 | ksi |
| 1.016 x 0.635 | mm | 3905 | 1768 | 928 | 578 | N/m | 1496 | 958 | 668 | 537 | MPa |
| 0.050 x 0.030 | in. | 47.3 | 21.4 | 11.7 | 7.1 | lb/in. | 252 | 160 | 121 | 91 | ksi |
| 1.270 x 0.762 | mm | 8283 | 3747 | 2049 | 1243 | N/m | 1737 | 1103 | 834 | 627 | MPa |
| 0.060 x 0.035 | in. | 88.4 | 40.2 | 22.0 | 13.4 | lb/in. | 290 | 199 | 146 | 115 | ksi |
| 1.524 x 0.889 | mm | 15481 | 7040 | 3853 | 2346 | N/m | 1999 | 1372 | 1006 | 793 | MPa |
| 0.070 x 0.040 | in. | 150.9 | 68.9 | 37.8 | 23.2 | lb/in. | 338 | 225 | 166 | 123 | ksi |
| 1.778 x 1.016 | mm | 26426 | 12066 | 6620 | 4080 | N/m | 2330 | 1551 | 1144 | 848 | MPa |

Fig. 13K

VERTICALLY ORIENTED CURVED LINER SPRING FOR KNIFE HANDLE

CROSS-REFERENCE TO RELATED APPLICATION

This application claims priority to U.S. Provisional Patent Application No. 63/393,099, filed Jul. 28, 2022, which is hereby incorporated by reference herein.

TECHNICAL FIELD

The present disclosure relates to the field of knives, and specifically to a liner for a knife, where the liner has an integrated spring.

BACKGROUND

Knives are available in a variety of designs as required for various purposes. Generally, knives can be configured with either a fixed blade or a folding blade. Folding blade knives are more convenient for many applications due to their more compact size. To improve safety and convenience, some folding blade knives employ a spring mechanism which biases the blade in the open or closed position. A locking mechanism can also be provided to lock the blade in the open position. However, existing spring mechanisms have a relatively low wear tolerance, take up additional space and are subject to maintenance issues.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

As mentioned, typically, two liners of the same type are provided in the handle, one on each side of the tang.

Figure 3B:
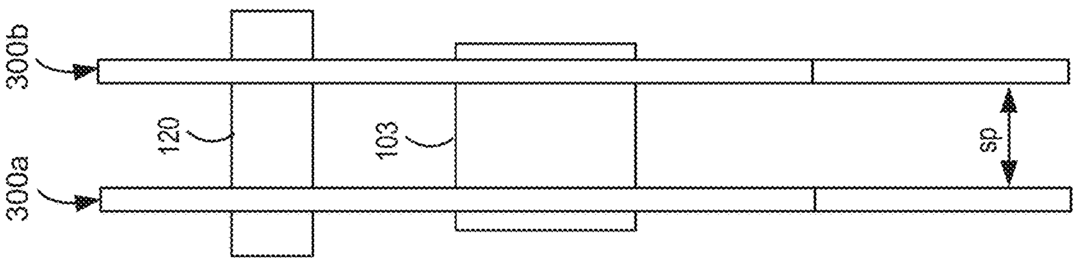
FIG. 3B is a view in the direction of the arrow 360 of FIG. 3A, in accordance with various embodiments. This view depicts two of the liners 300 as liners **300*a* and 300*b*, the lock stud 120 and the hub 103**.
Figure 3A:
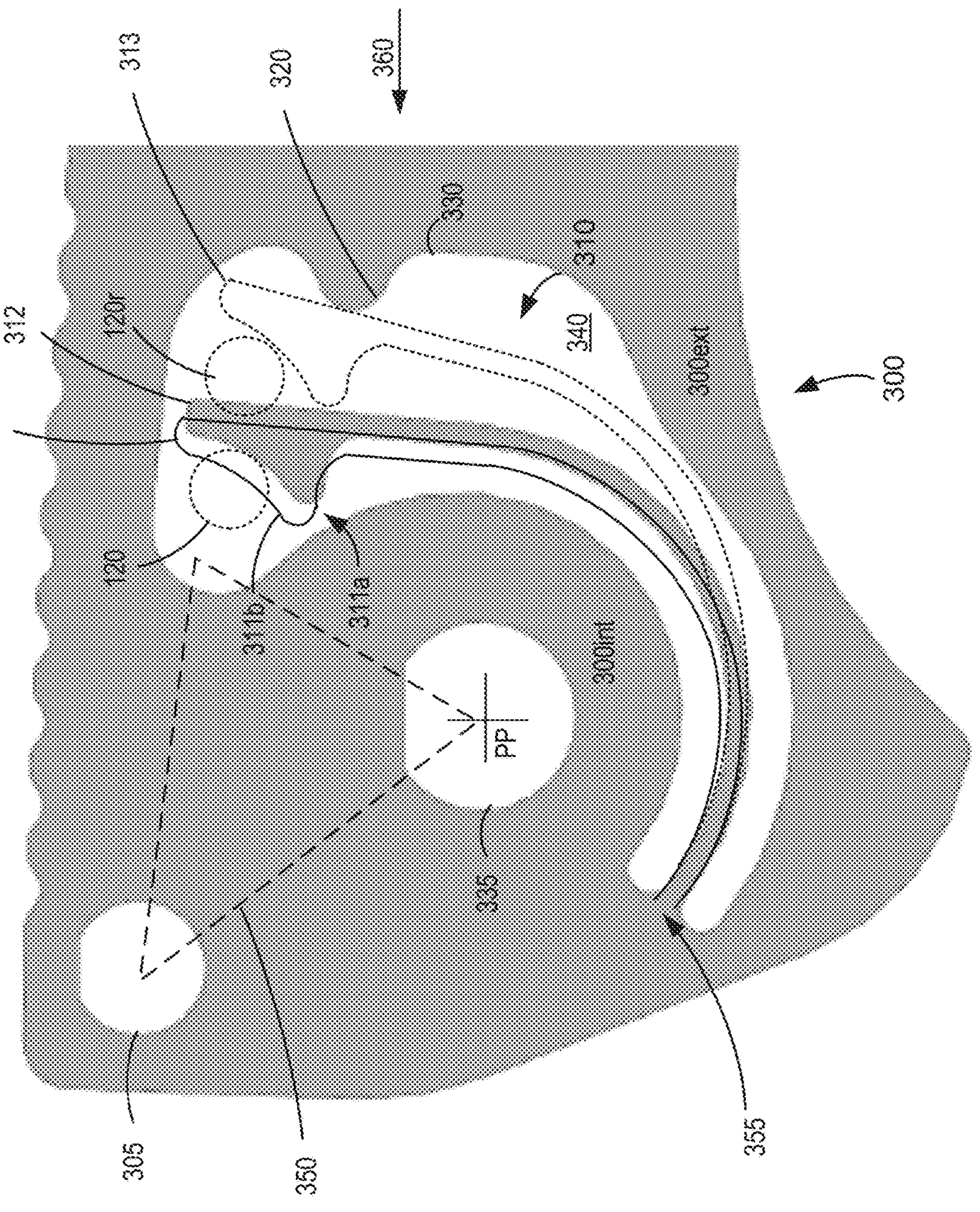
FIG. 3A is a side view of a portion of an example knife liner 300 which includes an integral, vertically-oriented, elongated spring 310, in accordance with various embodiments.
Figure 3C:
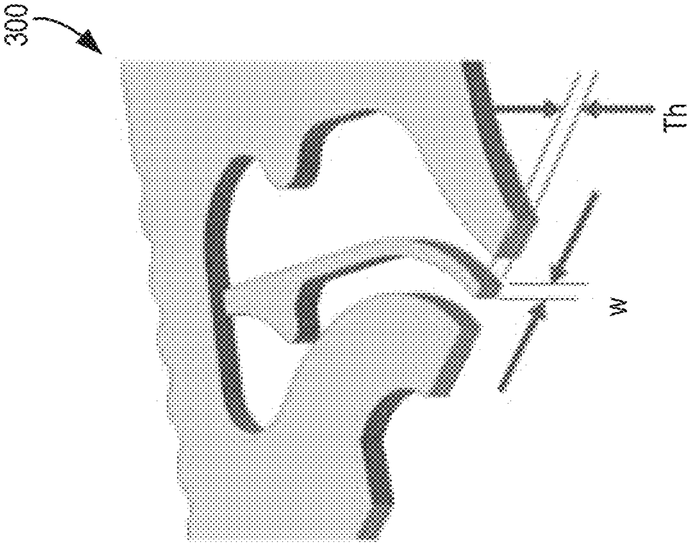

FIG. 3C depicts a perspective view of the liner 300 of FIG. 3A, showing a cross-sectional thickness, in accordance with various embodiments.

Figure 4:
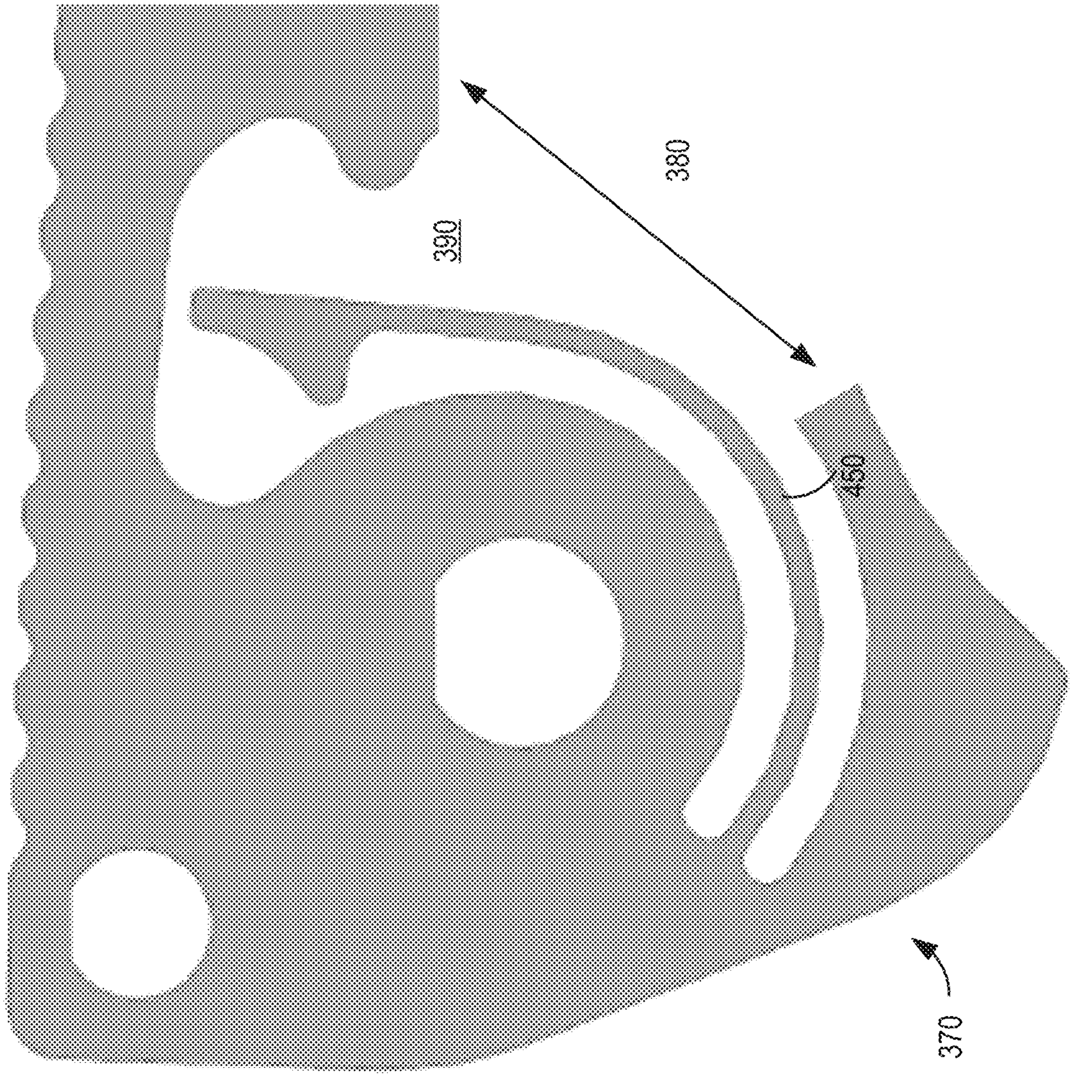

FIG. 4 is a side view of a portion of an example liner 370 similar to the liner 300 of FIG. 3A, but where the liner includes an opening 380, in accordance with various embodiments.

Figure 5:
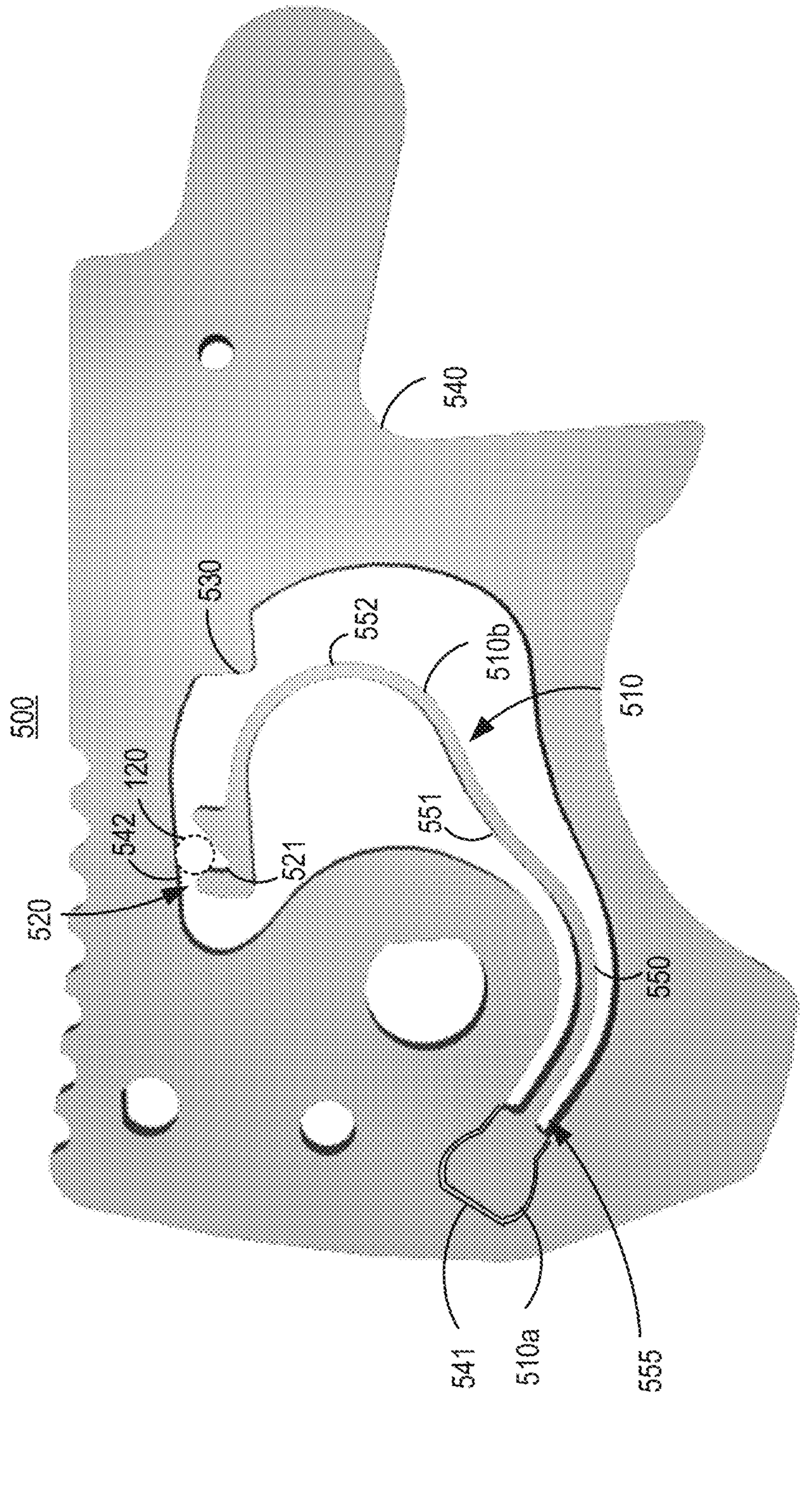

FIG. 5 depicts an example liner design 500 in which the spring 510 is a separate piece which is attached to the liner 540, in accordance with various embodiments.

Figure 6:
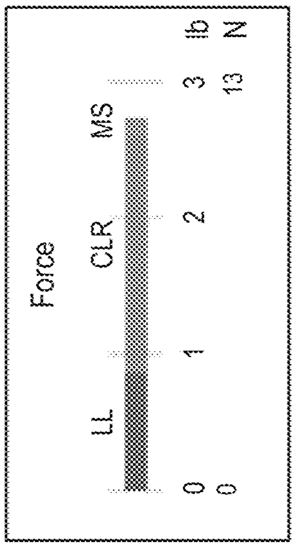

FIG. 6 depicts a chart showing a range of forces on an integral elongated spring, with a less preferred spring design, in accordance with various embodiments.

Figure 7:
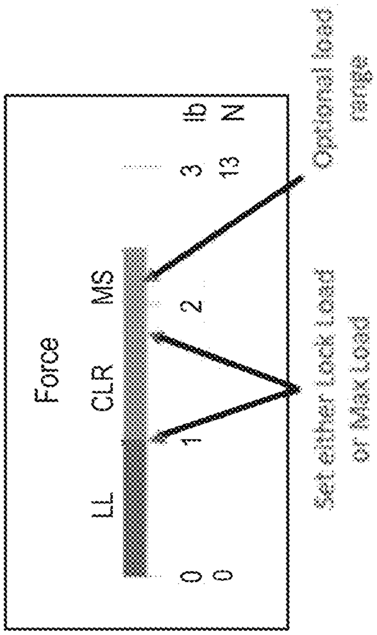

FIG. 7 depicts a chart showing a range of forces on an integral elongated spring, with a more preferred spring design, in accordance with various embodiments.

Figure 8B:
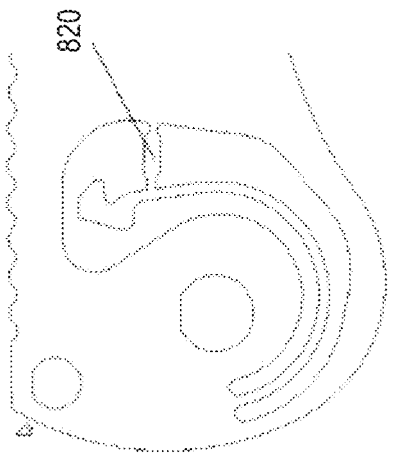
Figure 8A:
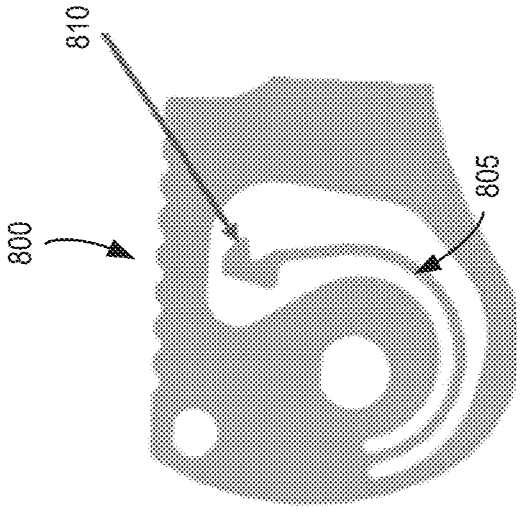

FIG. 8A depicts a side view of a liner 800 where a J-shaped spring 805 has a stopper 810, in accordance with various embodiments.

FIG. 8B depicts a side view of the liner 800 of FIG. 8A at the time of manufacture, where a tab 820 is added for stability, in accordance with various embodiments.

Figure 9:
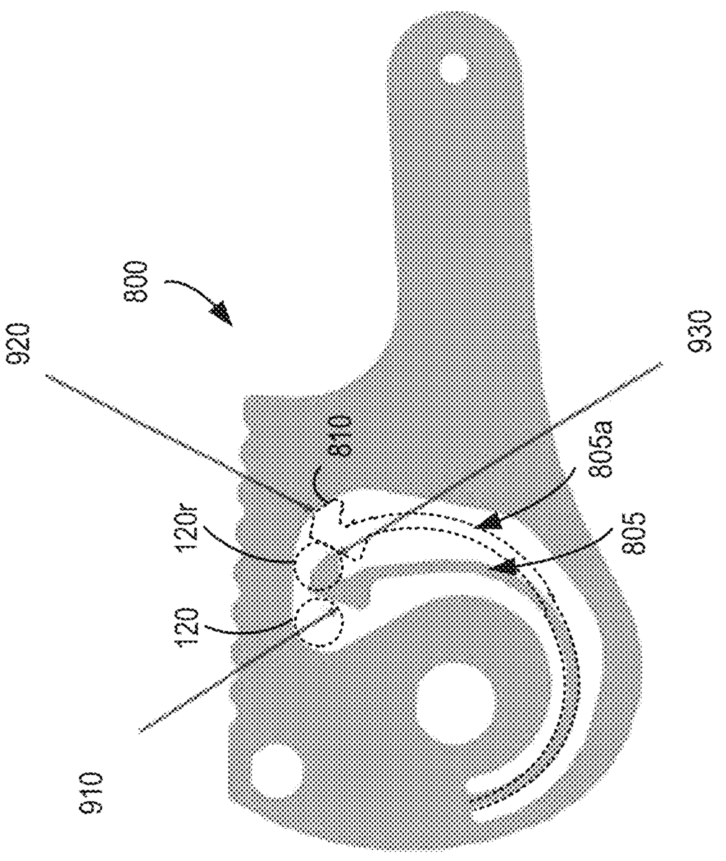

FIG. 9 depicts the liner 800 of FIG. 8A where the spring is in a lock load position and a max load position, in accordance with various embodiments.

Figure 2:
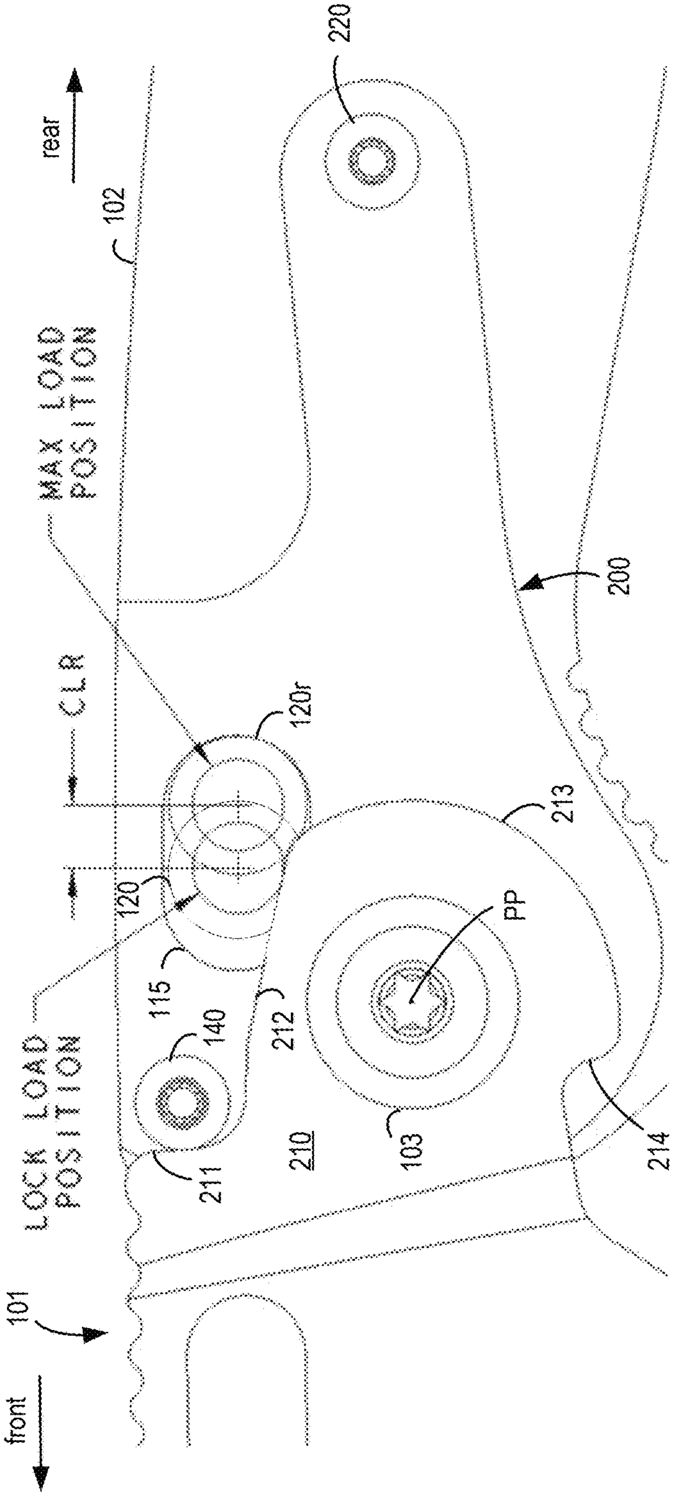
FIG. 2 is a side view of a portion of the knife of FIG. 1, including a liner 200, in accordance with various embodiments.
Figure 10:
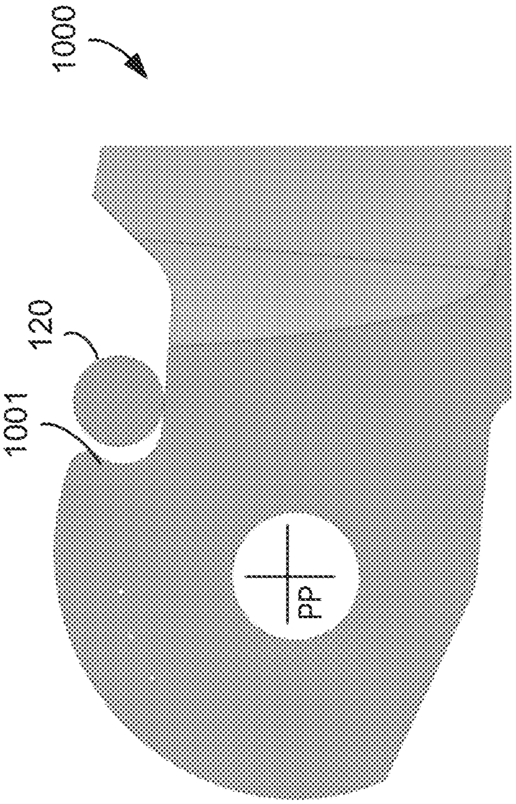

FIG. 10 is a side view of a tang 1000 with a hook in the knife of FIG. 2, in accordance with various embodiments.

Figure 11:
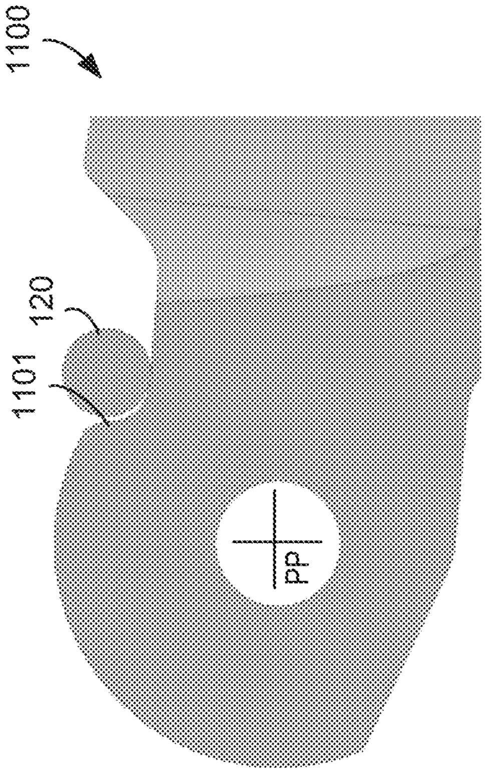

FIG. 11 is a side view of a tang 1100 without a hook in the knife of FIG. 2, in accordance with various embodiments.

Figure 12A:
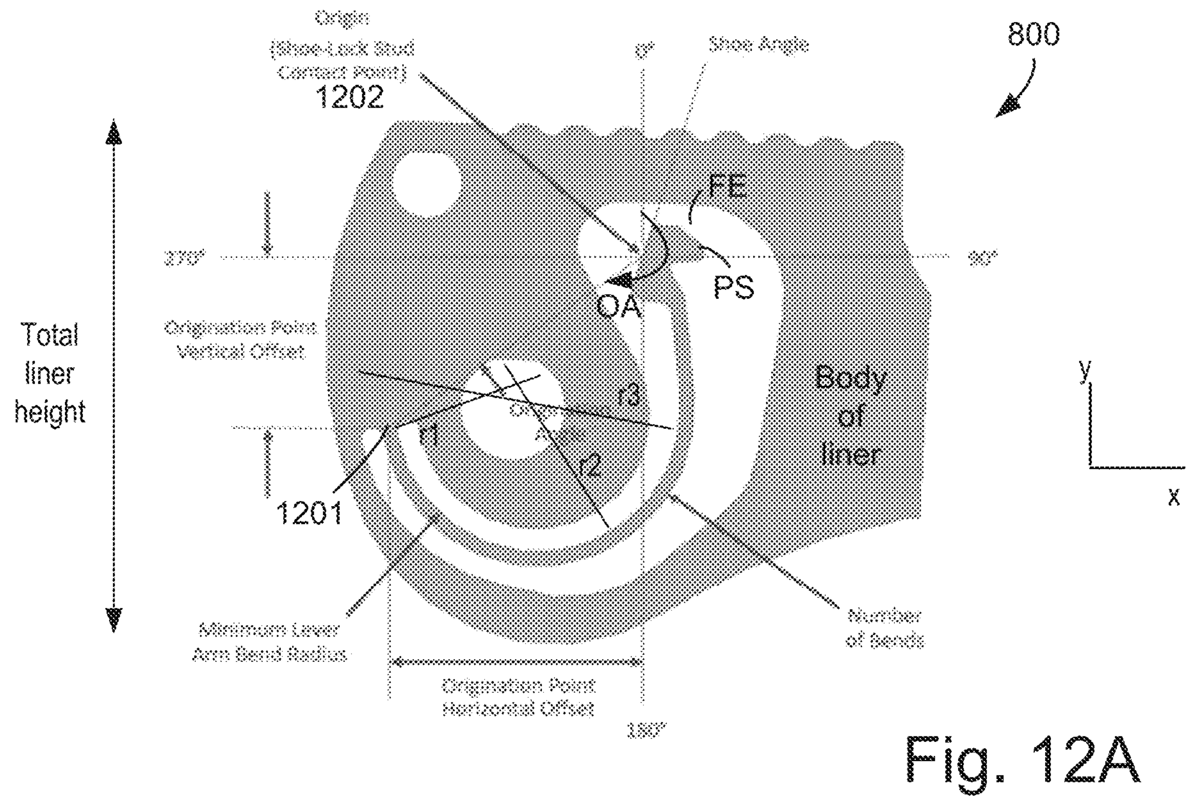

FIG. 12A depicts the liner 800 of FIG. 8A, showing various features, in accordance with various embodiments.

Figure 12B:
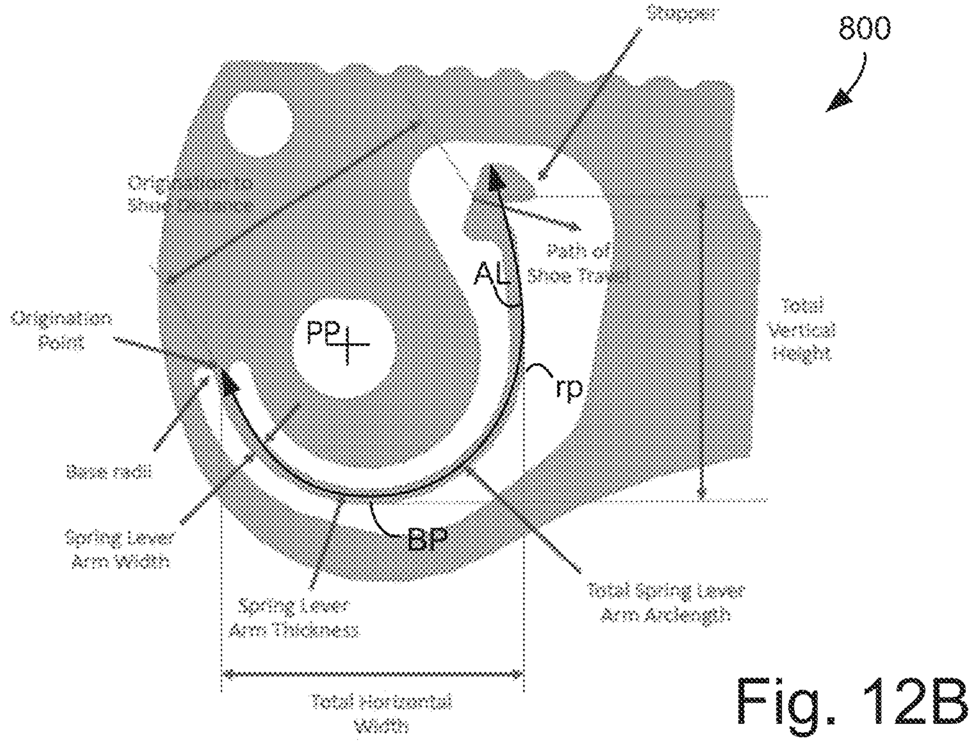

FIG. 12B depicts the liner 800 of FIG. 8A, showing various features, in accordance with various embodiments.

Figure 13A:
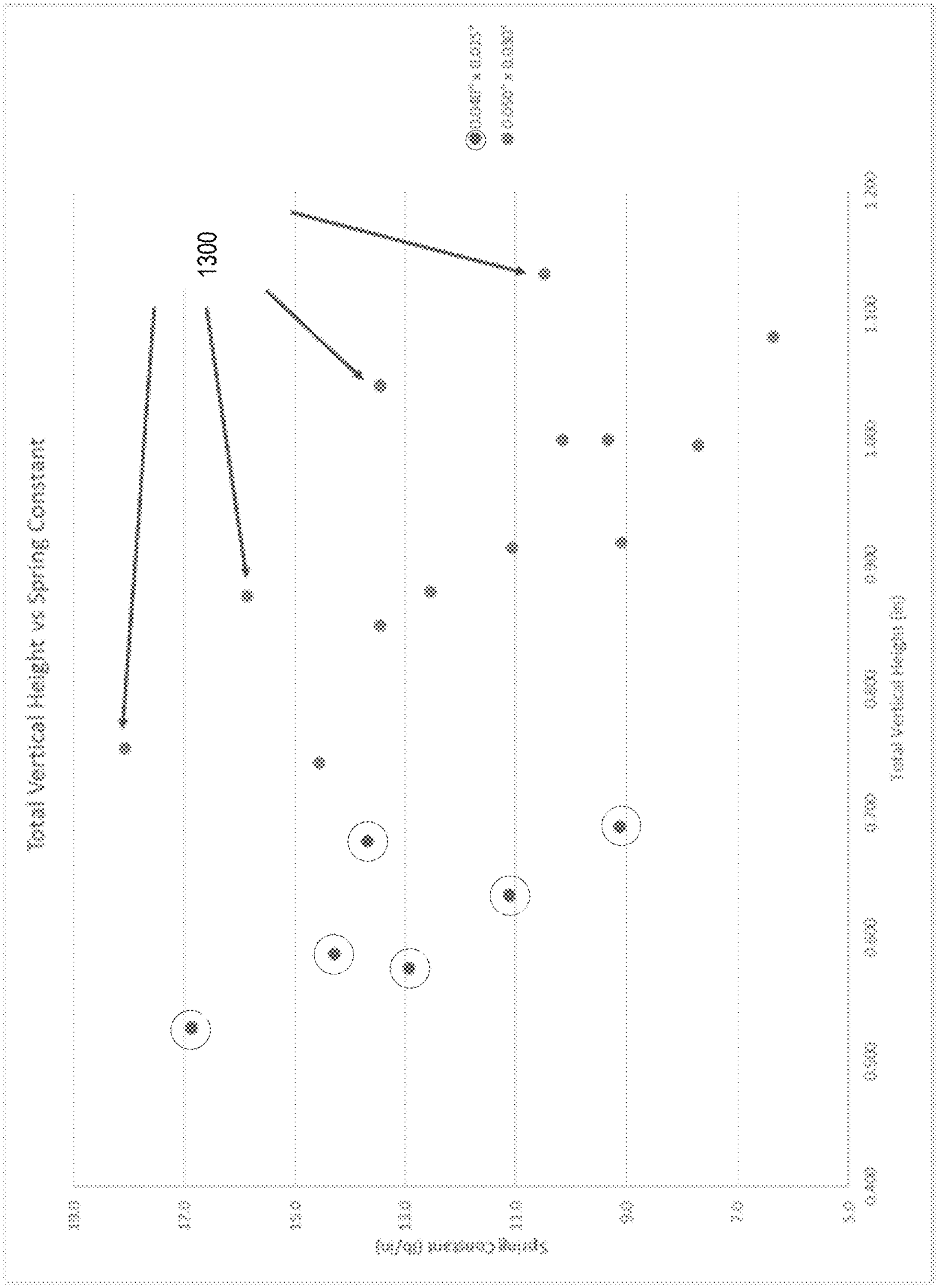

FIG. 13A depicts a plot of spring constant versus total spring vertical height for various liner designs, in accordance with various embodiments.

Figure 13B:
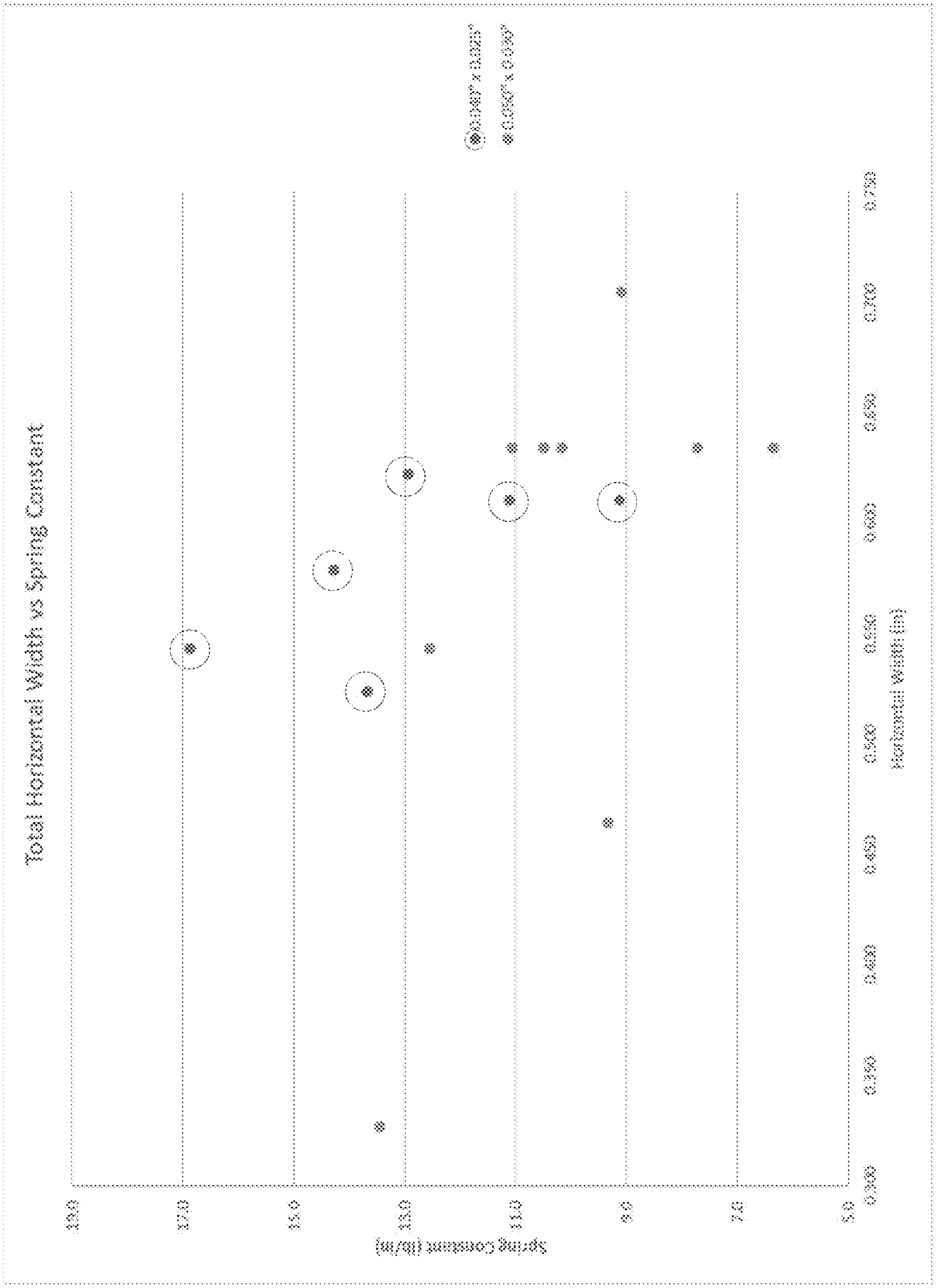

FIG. 13B depicts a plot of spring constant versus total spring horizontal width for various liner designs, in accordance with various embodiments.

Figure 13C:
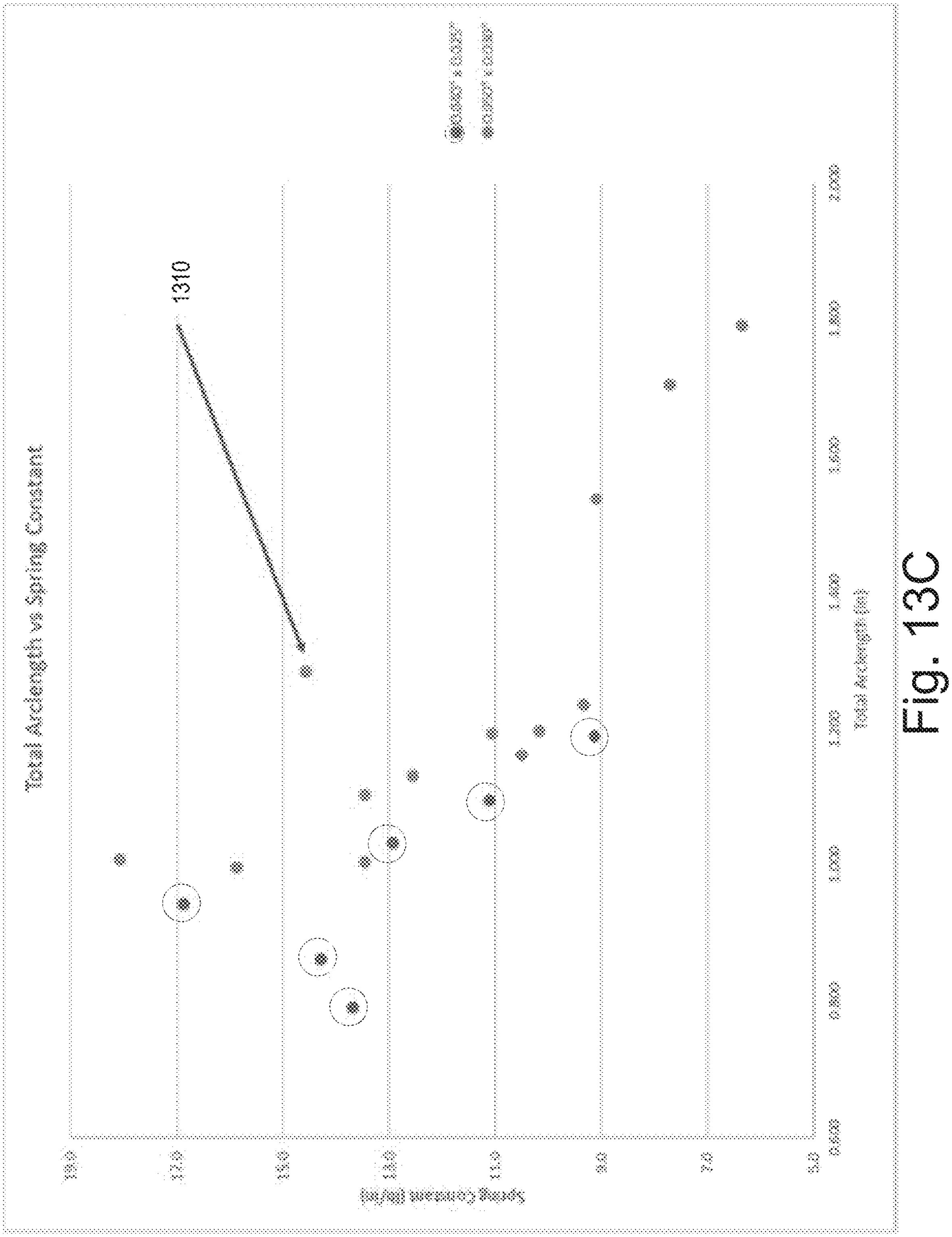

FIG. 13C depicts a plot of spring constant versus total spring arc length for various liner designs, in accordance with various embodiments.

Figure 13D:
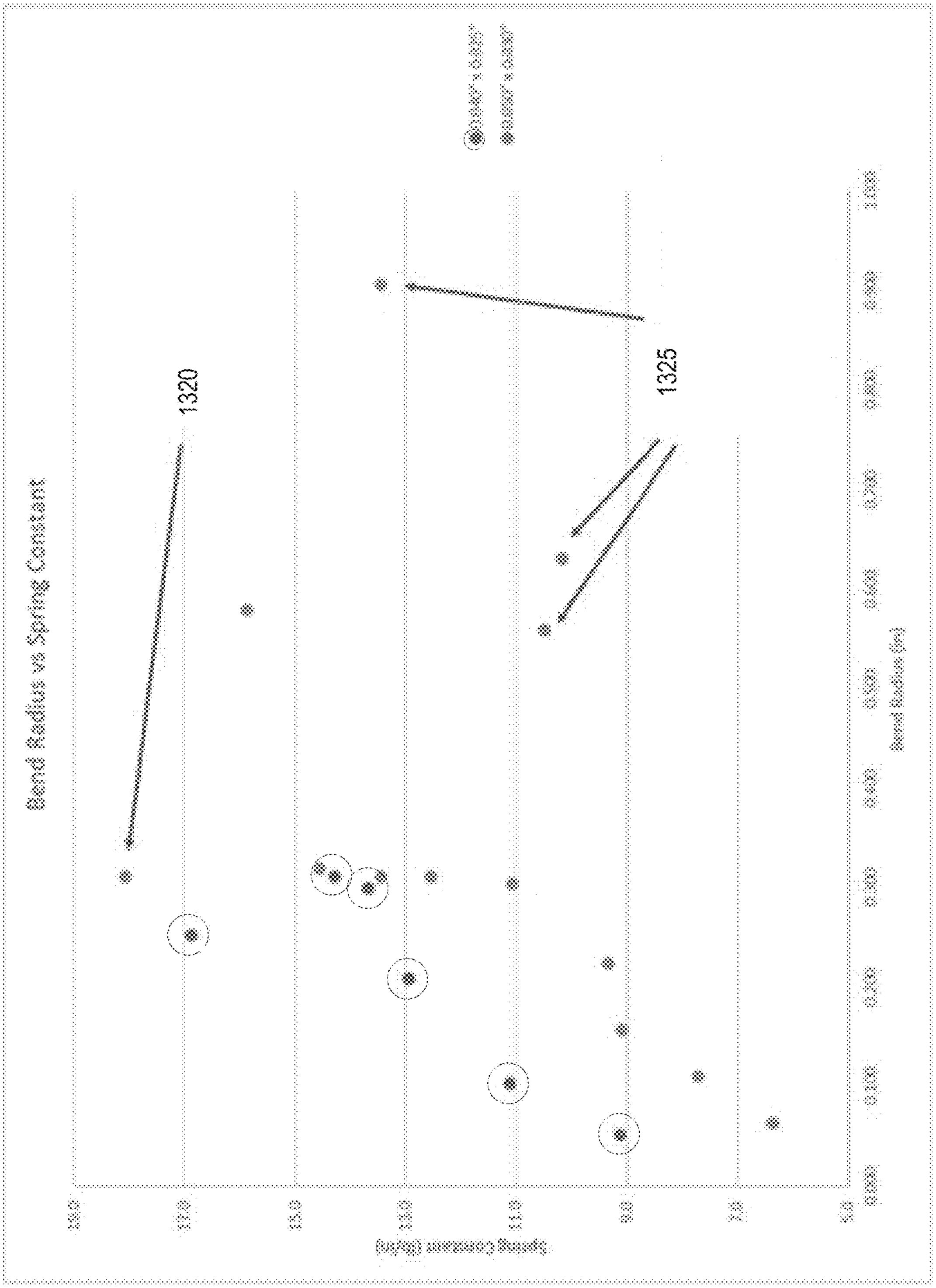

FIG. 13D depicts a plot of spring constant versus minimum bend radius for various liner designs, in accordance with various embodiments.

Figure 13E:
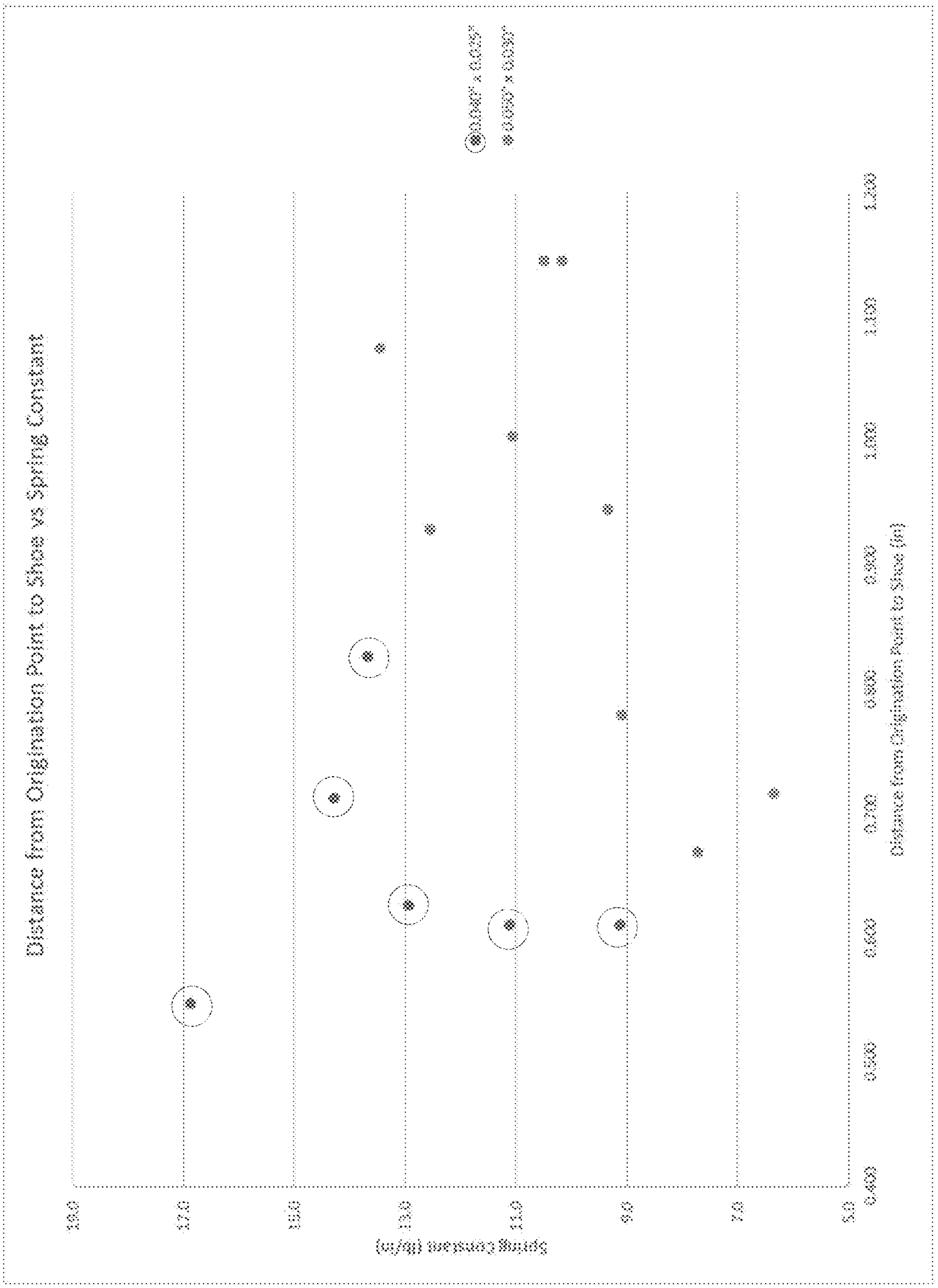

FIG. 13E depicts a plot of spring constant versus distance from origination point to shoe for various liner designs, in accordance with various embodiments.

Figure 13F:
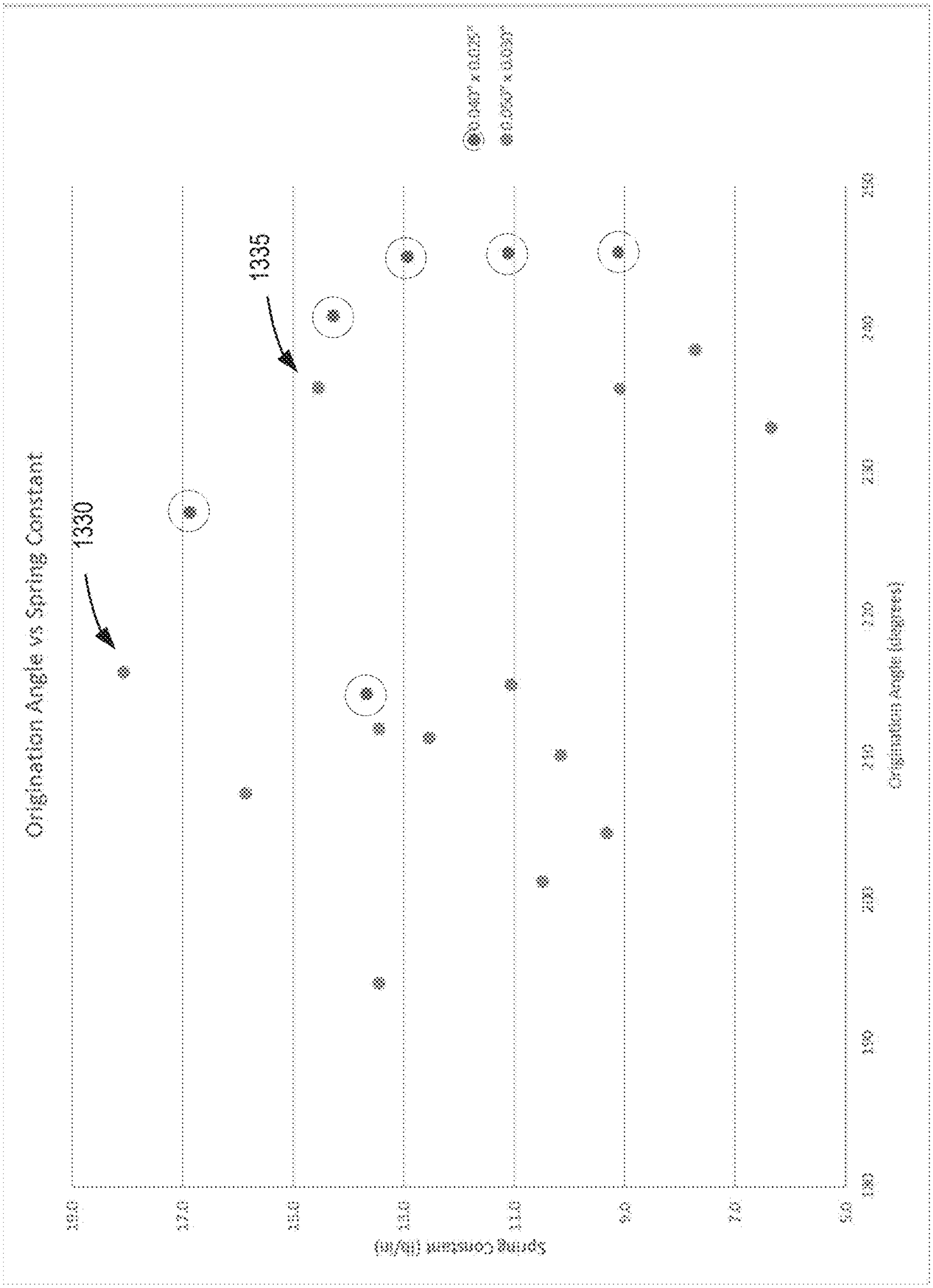

FIG. 13F depicts a plot of spring constant versus origination angle for various liner designs, in accordance with various embodiments.

Figure 13G:
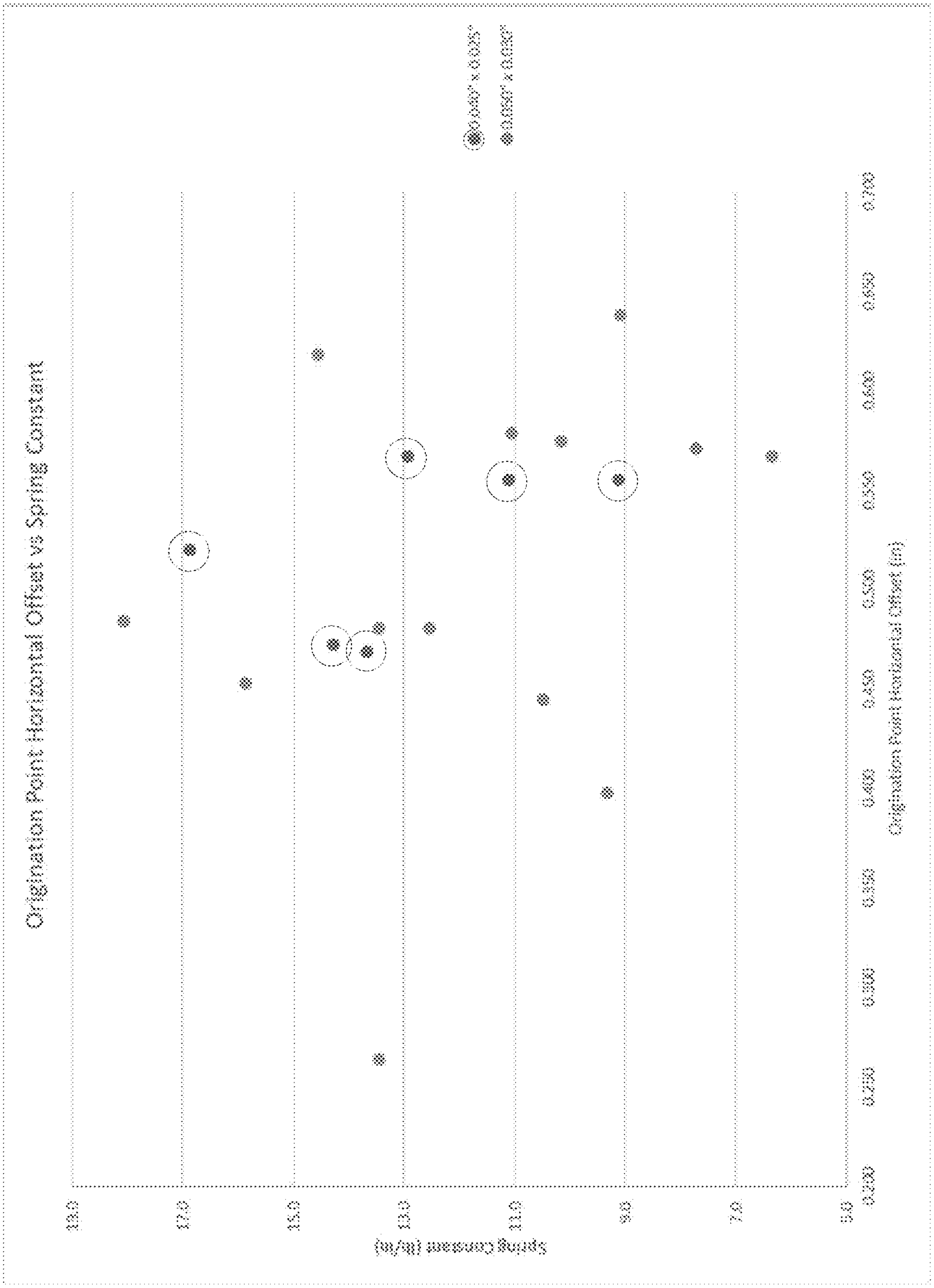

FIG. 13G depicts a plot of spring constant versus origination point horizontal offset for various liner designs, in accordance with various embodiments.

Figure 13H:
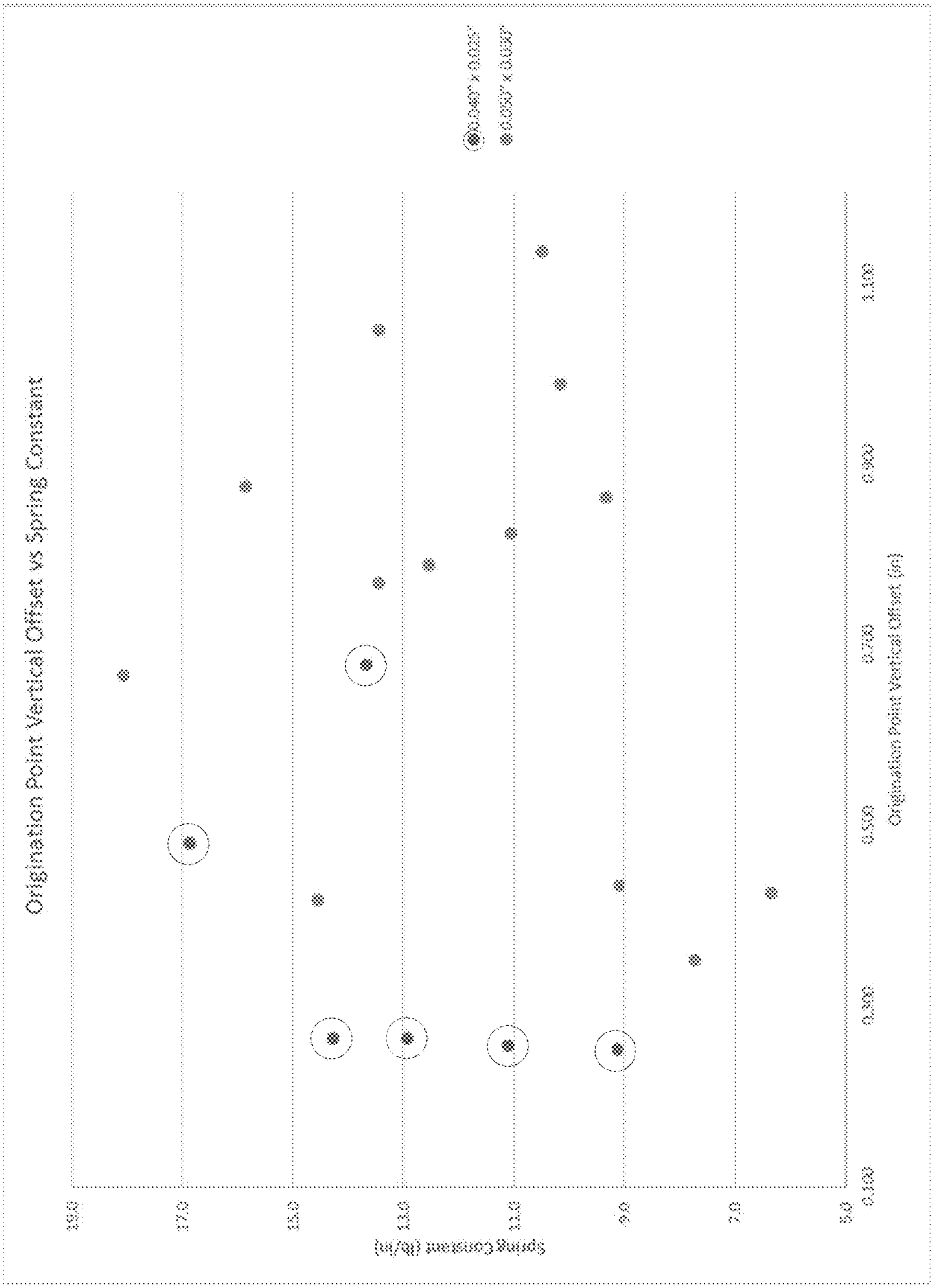

FIG. 13H depicts a plot of spring constant versus origination point vertical offset for various liner designs, in accordance with various embodiments.

Figure 13I:
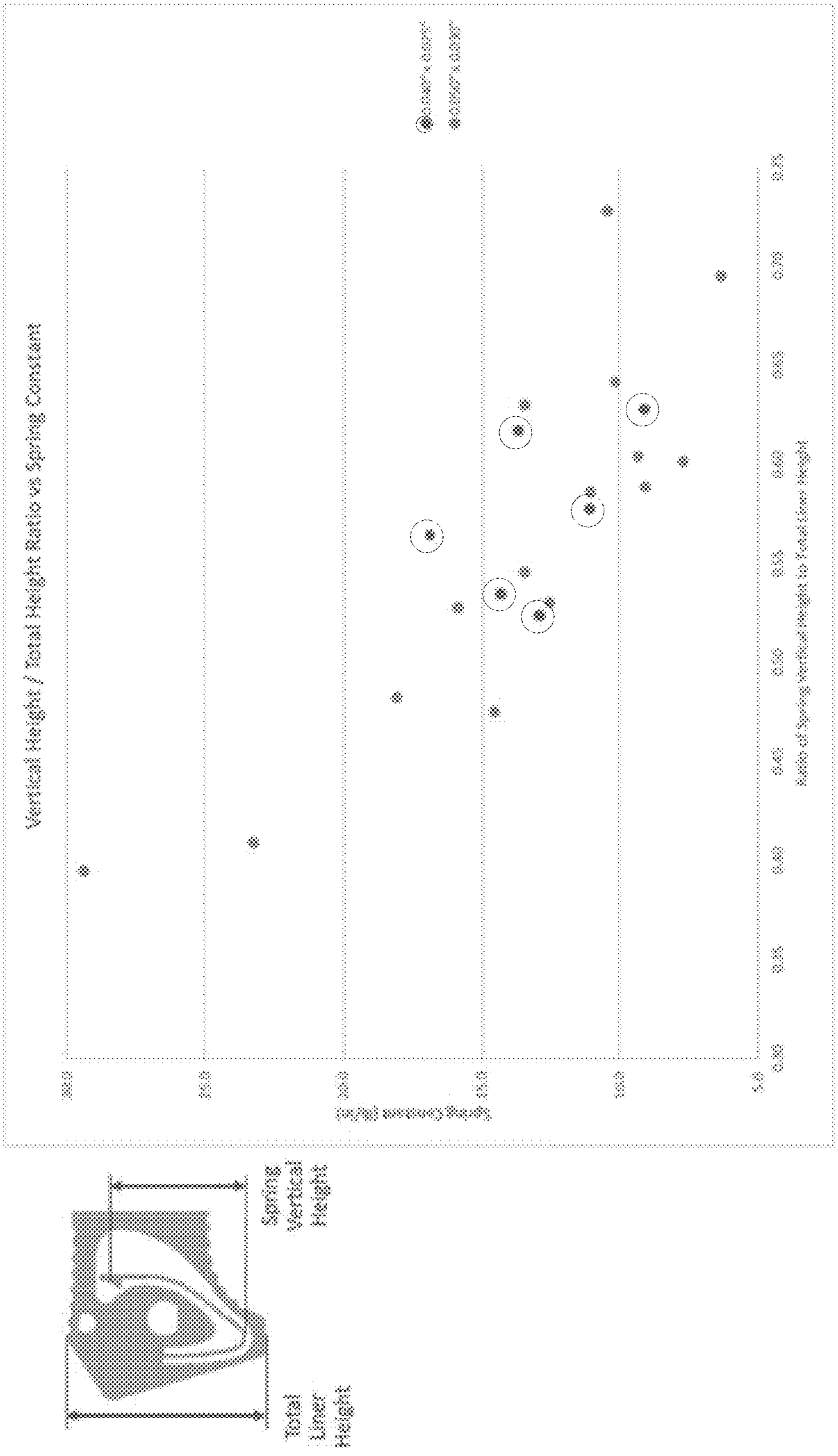

FIG. 13I depicts a plot of a ratio of spring vertical height to total liner vertical height versus spring constant for an example liner, in accordance with various embodiments.

Figure 13J:
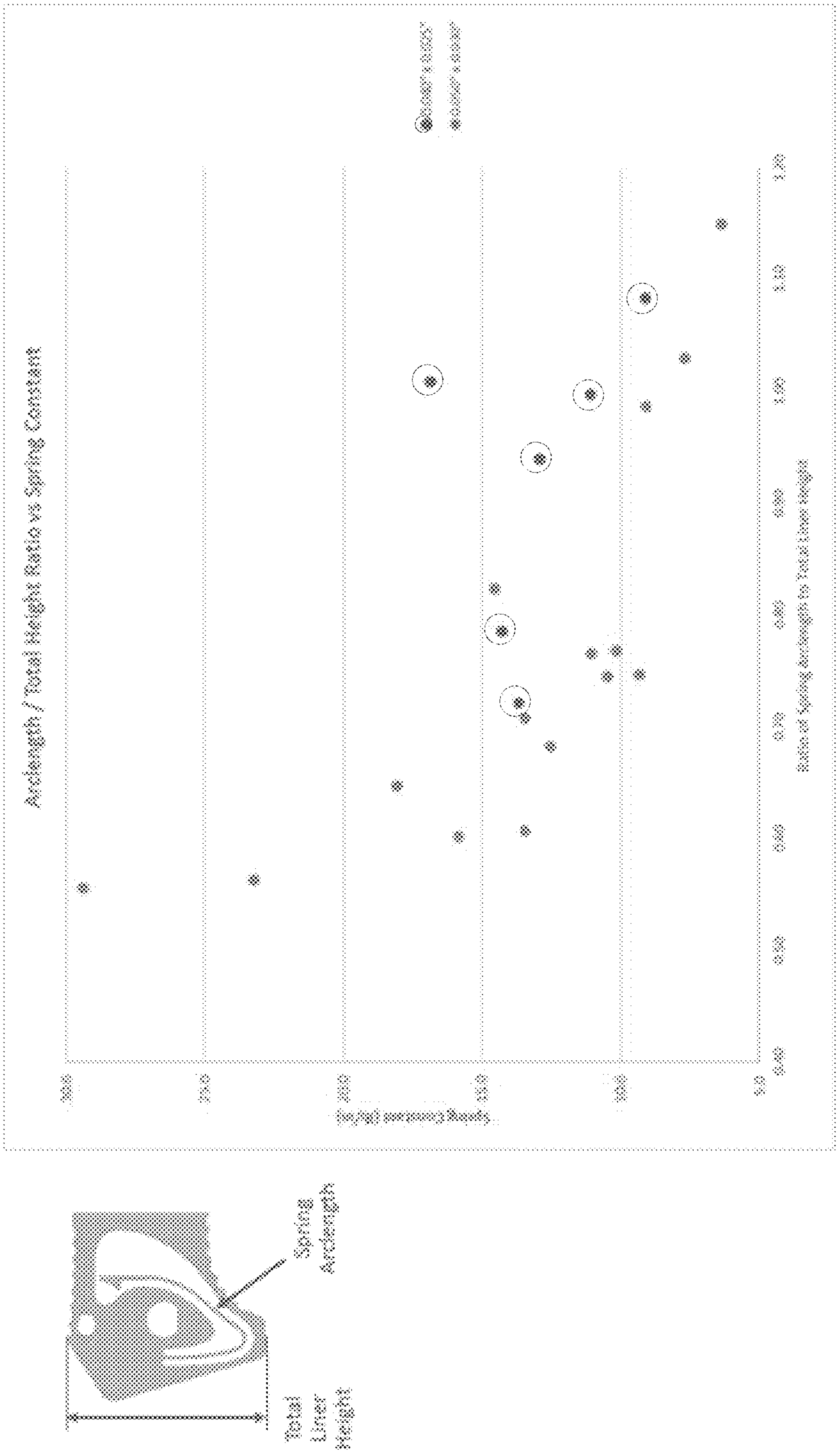

FIG. 13J depicts a plot of a ratio of arc length to total liner vertical height versus spring constant for the example liner of FIG. 13I, in accordance with various embodiments.

FIG. 13K depicts an example table of spring constants and stress values as a function of spring dimensions, in accordance with various embodiments.

Figure 13L:
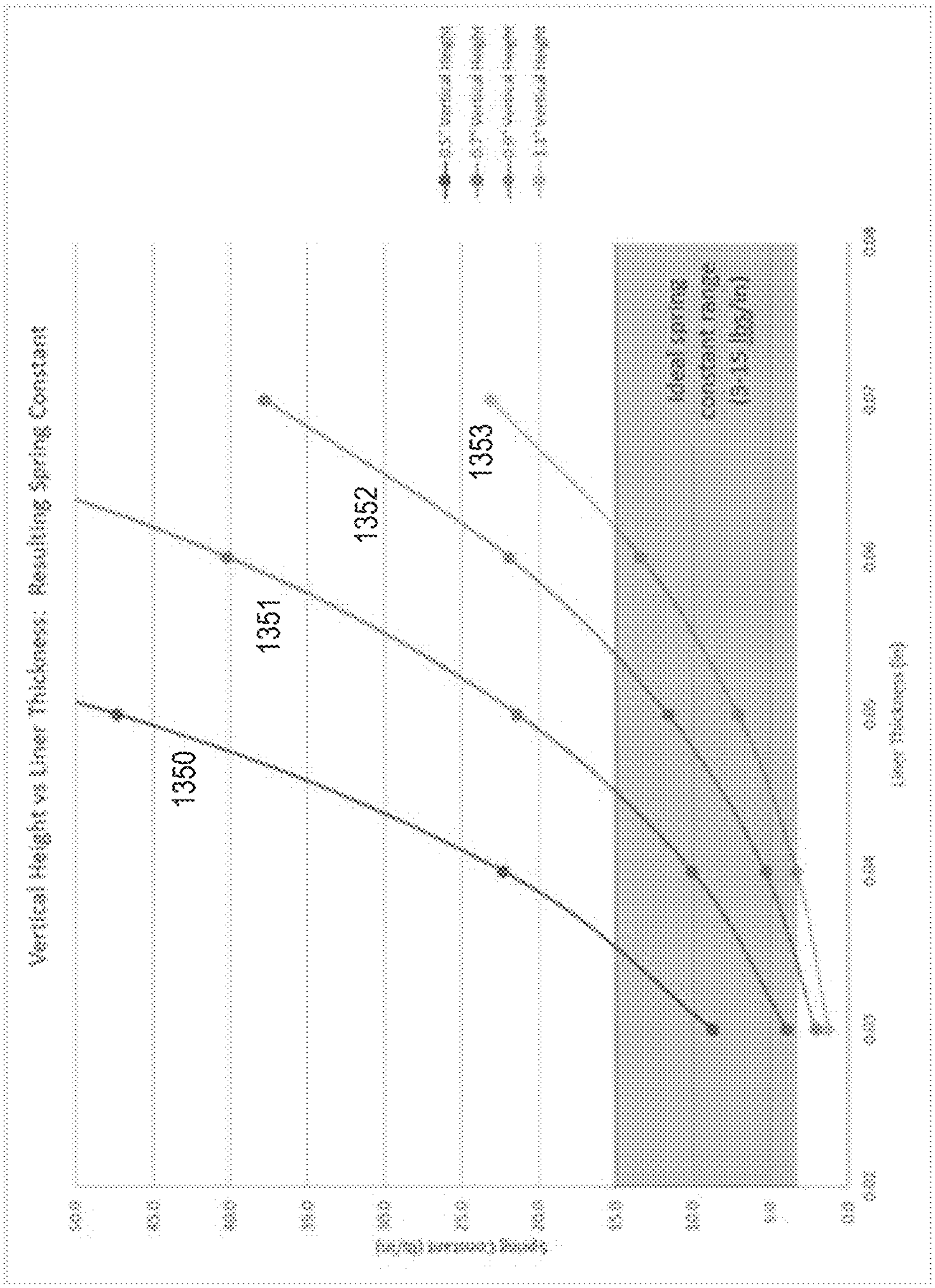

FIG. 13L depicts plots of spring constant as a function of liner thickness and spring vertical height, consistent with the table of FIG. 13K, in accordance with various embodiments.

Figure 13M:
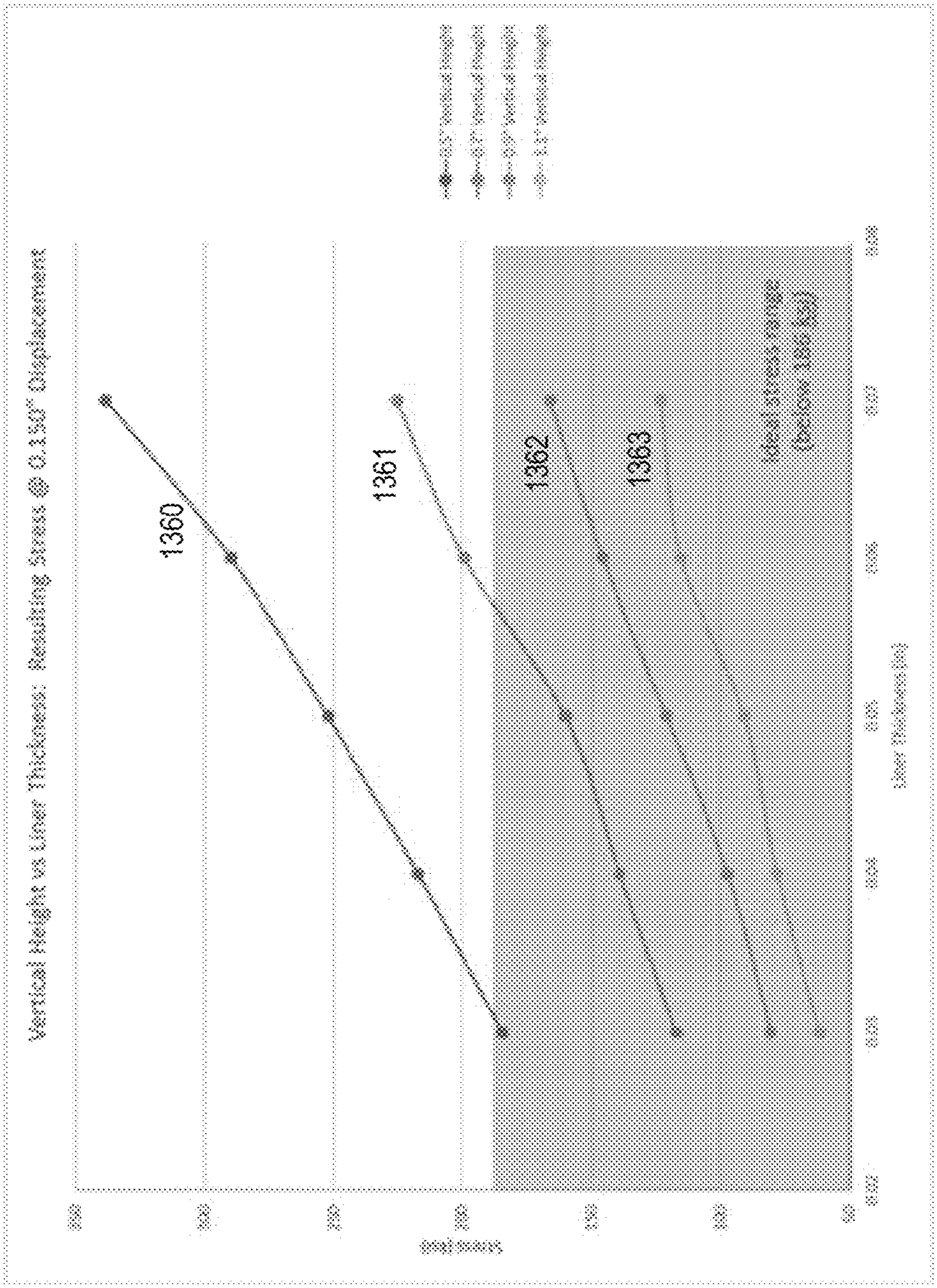

FIG. 13M depicts a plot of stress as a function of liner thickness and spring vertical height, consistent with the table of FIG. 13K, in accordance with various embodiments.

Figure 14:
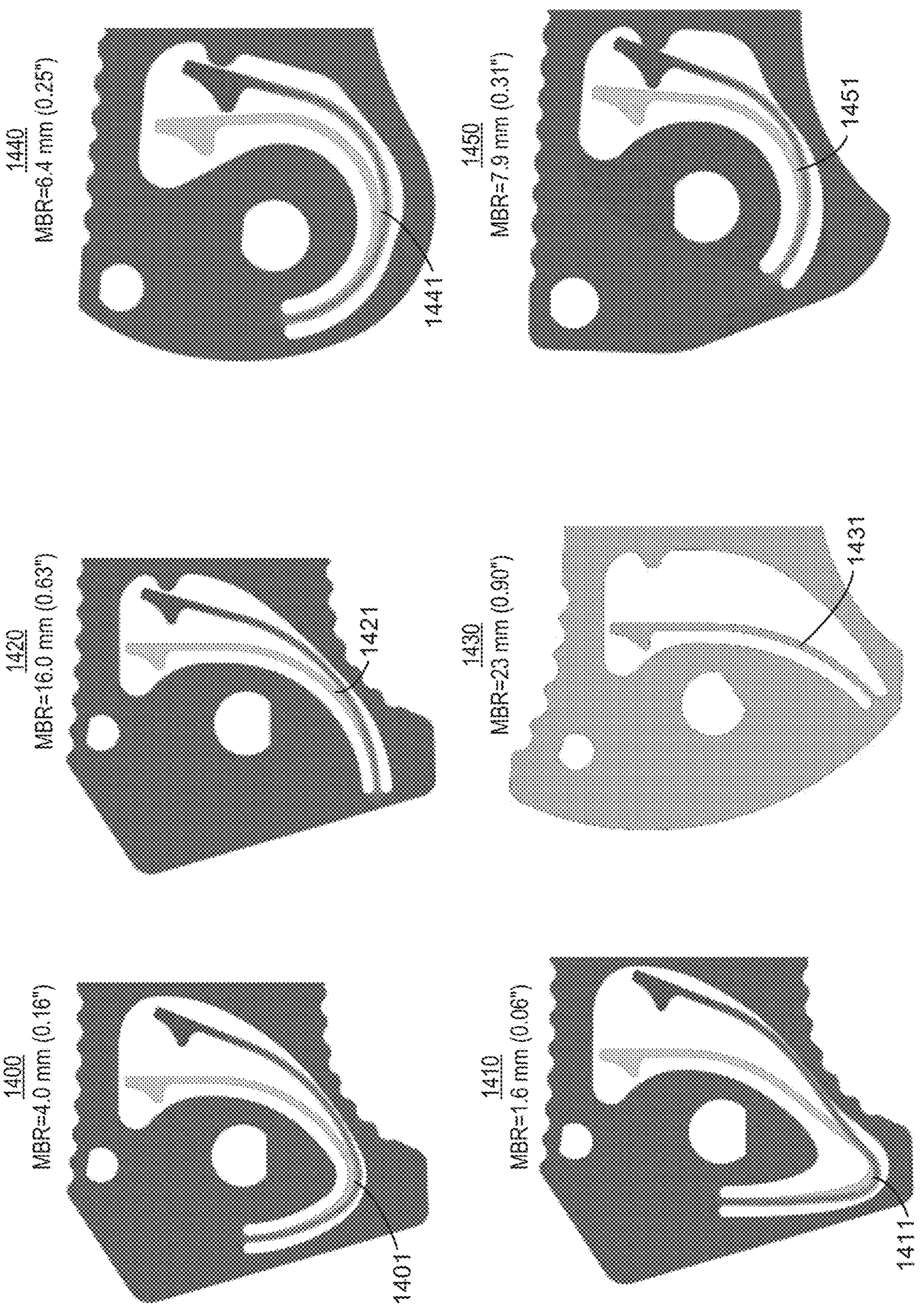

FIG. 14 depicts example liner designs with different minimum bend radii, in accordance with various embodiments.

Figure 15:
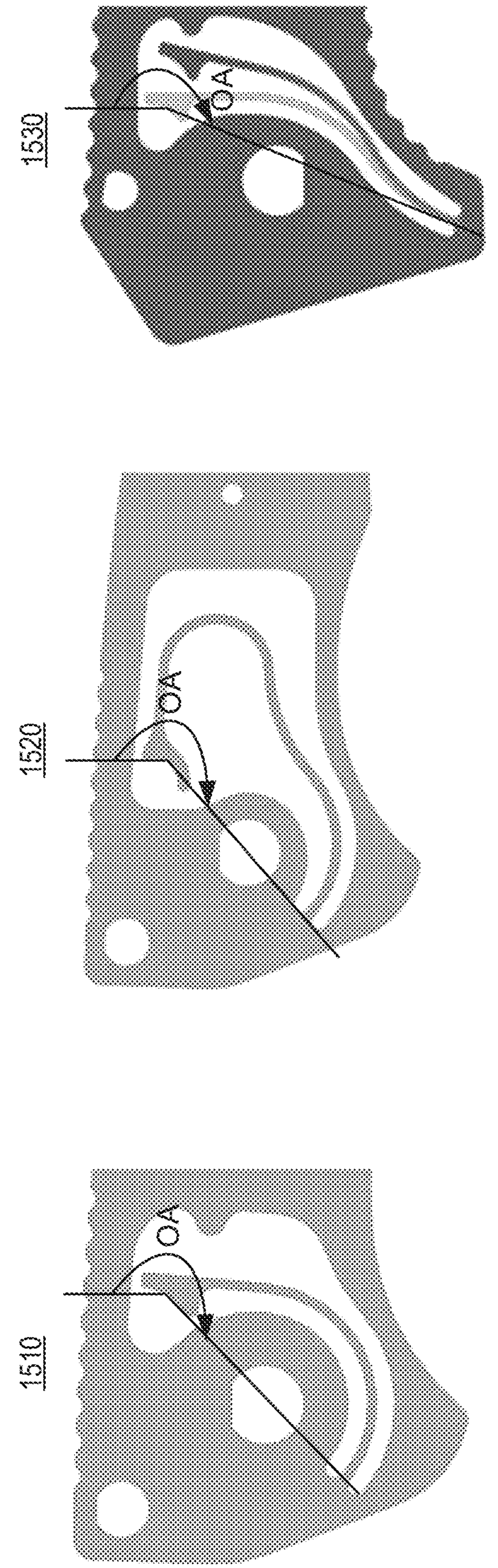

FIG. 15 depicts example liner designs with different origination angles, in accordance with various embodiments.

Figure 16:
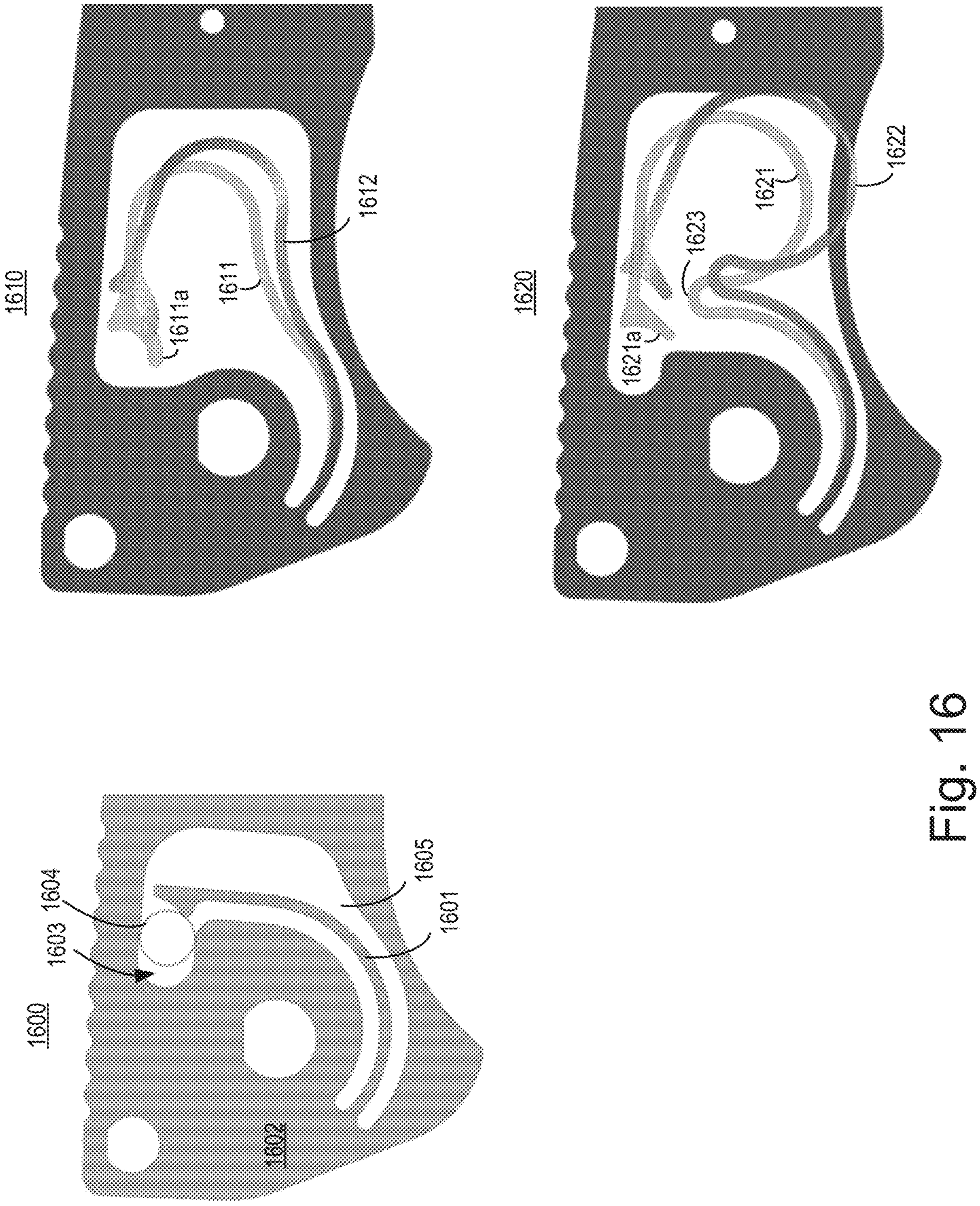

FIG. 16 depicts example liner designs, in accordance with various embodiments.

Figure 17:
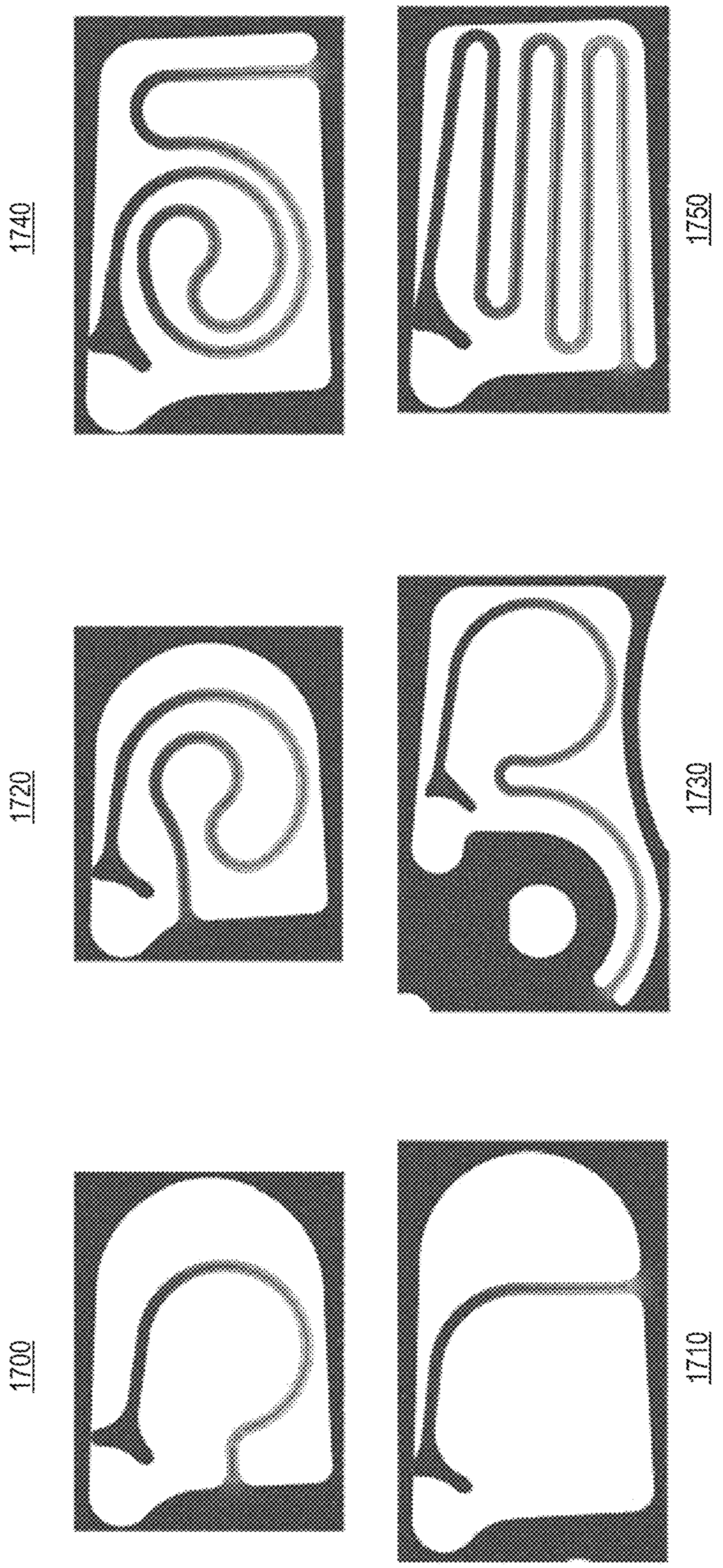

FIG. 17 depicts example liner designs which vary in efficiency, in accordance with various embodiments.

DETAILED DESCRIPTION

In the following detailed description, reference is made to the accompanying figures which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

As mentioned at the outset, various challenges are presented in providing a spring mechanism for a folding knife. One approach is to use a horseshoe-shaped (or omega-shaped, referring to the Greek symbol "Ω") lock spring which is attached to both liners in the handle of the knife to bias a lock bar which moves in a slot when the blade is opened and closed. See, e.g., U.S. Pat. No. 9,862,104, issued Jan. 9, 2018, and incorporated herein by reference, which discloses a horseshoe-shaped lock spring which is attached to a liner to bias a lock bar. Other approaches include a liner lock spring which extends along the length of the handle, typically at one side of the handle, and safety spring which extends along the length or edge of the handle. However, these approaches have disadvantages in terms of wear tolerance, space requirements and maintenance issues The apparatuses described herein address the above and other issues. In one aspect, a liner for a folding knife includes a vertically-oriented spring as part of one or both liners in the knife handle. The vertically-oriented spring is curved and elongated and can be a J-shaped spring, for example, although other shapes are possible. The spring can be formed out of the same sheet of metal or other material from which the liner is formed, or the spring can be formed as a separate piece which is attached to the liner and secured to the liner such as in a friction fit. The spring can have characteristics as described herein which provide a good feel for the user when opening and closing the blade, e.g., based on factors such as the amount of tension needed to open or close the blade. The spring can be arranged to bias a lock stud which moves in a slot in the handle when the blade is opened and closed, where the lock stud is in contact with the tang of the blade. The spring thus biases the blade toward the open and closed positions for safety.

The liner designs described herein are expected to have significantly increased longevity as well, allowing a significantly larger number of open/close cycles for the knife blade compared to previous designs.

The liner designs also allow for a thinner handle width since the spring is integrated into, or attached to, the liner in a cutout region in a plane of the liner. Additionally, with a vertically oriented spring, the horizontal length of the liner can be reduced, allowing for various design options for the handle.

The above and other advantages will be further apparent in view of the following discussion.

Figure 1:
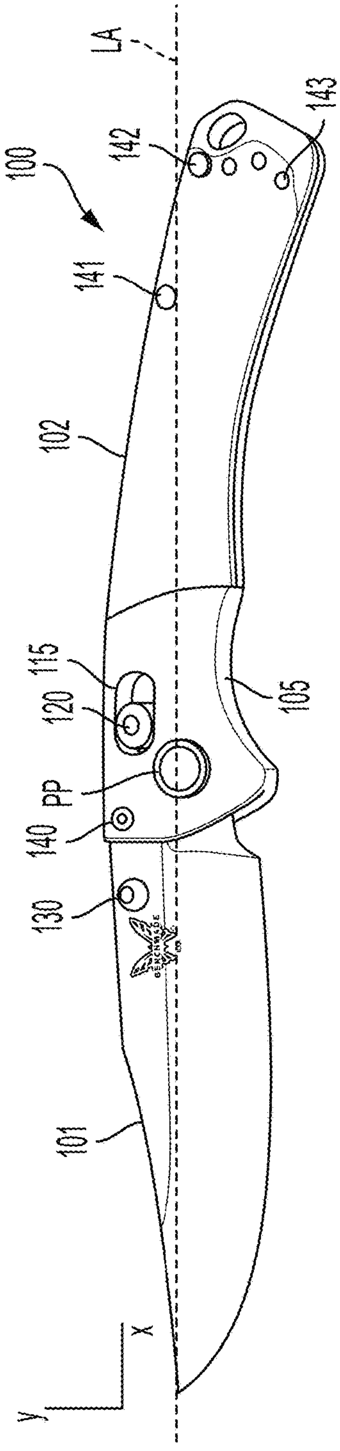
FIG. 1 is a side view of an example knife 100 in accordance with various embodiments.

FIG. 1 is a side view of an example knife 100 in accordance with various embodiments. The knife includes a blade 101 and a handle 102, and extends along a longitudinal axis LA. A bolster 105 of the handle includes a pivot point PP or axis about which the blade can rotate, and a slot 115 in which a lock stud 120 can move in a frontward or rearward direction. In one approach, the lock stud is in the frontward direction when the blade is in the open or closed position, and temporarily moves to the rearward direction when the blade is in an intermediate or partly open position. In particular, the lock stud can interact with a tang of the blade to lock the blade in the open position or to allow it to rotate to the closed position. The spring mechanism provides a force on the tang via the lock stud and can assist the user in opening or closing the blade.

The frontward direction can be, e.g., in the direction toward the front of the knife or the blade tip, parallel to the longitudinal axis. The rearward direction can be, e.g., in the direction opposite the frontward direction, toward the back of the knife. Referring to the x-y coordinate system, the frontward direction can be in the x direction, and the rearward direction can be in the −x direction. The vertical direction can be the y direction.

A thumb button 130 can be engaged by the user's thumb to help move the blade to the open or closed position. The handle includes a number of fasteners 140-143 to secure the opposing sides of the handles together. The fastener 140 also acts as a stop pin.

Folding blade knives can be used for various purposes in the home, while cooking and while outdoors. Such knives are sized to fit the typical user's hand and may be about 4-5 inches (101-127 mm) long with the bladed closed or 7-8 inches (178-203 mm) long with the blade open, for example.

FIG. 2 is a side view of a portion of the knife of FIG. 1, including a liner 200, in accordance with various embodiments. Typically, two liners of the same type are provided in the handle, one on each side of the tang. The liner is attached to the handle shells or covers using a fastener 220. The blade 101 includes a tang 210 which is mounted on a hub 103 to pivot about the pivot point PP. The tang includes a top shoulder 211 which rests against the fastener/stop pin 140 when the blade is in the fully open position. The stop pin prevents the blade from rotating clockwise. The tang also includes a bottom shoulder 214. The tang also includes a straight, ramped portion 212 which contacts the lock stud 120 when the blade is in the fully open position. The lock stud prevents the blade from rotating counter clockwise as long as the lock stud is in the frontward position in the slot. A spring mechanism, not shown, biases the lock stud to the frontward position to ensure that the blade remains safely locked when it is in the open position.

When the user manually moves the lock stud to the rearward position, as depicted by the lock stud 120*r*, the tang is free to rotate to allow the blade to be moved to the closed position. When the tang rotates counter clockwise, a rounded portion 213 of the tang contacts the lock stud so that the lock stud does not prohibit the rotation of the blade. The lock stud is pushed rearward by the rounded portion 213 of the tang, so that the force on the spring mechanism increases. The frontward position of the lock stud is a lock load position because the blade is locked in this position. The spring mechanism may exert a relatively small force on the lock stud to keep it in the frontward, lock load position. The rearward position of the lock stud is a maximum (max) load position because the load on the spring mechanism is at a maximum. CLR refers to a cycle load range which is the difference between the max load and the lock load.

The following definitions can be made:

"Lockup load" or "lock load": the sum of the forces applied by both springs of the two liners to the lock stud in the lock load position. This includes preload and wear-in tolerance.

"Max load": The sum of the forces applied by both springs to the lock stud in the max load position. This is when the lock stud is in the furthest rearward position in the knife handle, and includes any excess travel at the end.

"Cycle Load Range (CLR)": The difference between the max load and the lock load, i.e., (Spring constant)×(Stroke).

"Total stroke length" or "stroke": the distance the lock stud travels from the lock load position to the max load position.

FIG. 3A is a side view of a portion of an example knife liner 300 which includes an integral, vertically-oriented, elongated spring 310, in accordance with various embodiments. In one approach, two such liners are provided in the knife handle, one on each side. The liner includes an opening 305 for the stop pin and an opening 335 for the hub. The pivot point PP is also depicted.

The spring 310 is integrally formed in one piece of sheet metal with the liner in this example, e.g., the curved elongated spring is formed integrally in one piece with the liner body. In other examples, the spring is formed separately from the liner and then attached to the liner during its manufacture, e.g., the curved elongated spring is a separate piece which is attached to the liner body.

The spring is generally J-shaped in this example but could have other shapes. The spring can be generally curved. The spring can be vertically oriented in that its height is greater than its total horizontal width. The spring extends in a cutout region 340 in a body of the liner from a tie-off or origination point 355. This point can be below and frontward of the pivot point. The spring, also referred to as a lever arm, extends in an arc from its origination point, downward to a point which is directly below the pivot point, then upward to a point which is above and to the right of the pivot point. Note that the front of the knife handle is to the left and the rear of the knife handle is to the right in this figure. This convention applies to other liner figures herein as well. The spring is depicted in three positions in this example. The spring 311 represents the stamped position in which the spring is formed. The spring is not under a load in this position. The spring includes a shoe 311*a* with a face 311*b* on which the lock stud can rest. The spring 312 represents the lock load position, where the spring is under a relatively small load while the lock stud 120 rests against the face of the shoe. The spring 313 represents the max load position where the spring is under the maximum load while the lock stud 120*r* rests against the face of the shoe.

In an example embodiment, a triangular region 350, referred to as a lockup triangle, is substantially intact for strength. The liner includes an interior portion 300*int* on one side of the cutout region, and proximate to the opening 335, and an exterior portion 300*ext* on an opposing side of the cutout region. The cutout can extend to the outer perimeter of the liner and doesn't need to be enclosed. For example, see FIG. 4.

A stopper 320 is a bump in the wall 330 of the cutout to limit the rearward movement of the spring and the shoe. The bump extends toward the front of the knife in this example. All contact of the spring to the liner should be behind the shoe. It is not desired for the middle of the spring to contact the liner. The spring can extend to the outer perimeter in a deformed (max load) state but not the neutral (lock load) state.

FIG. 3B is a view in the direction of the arrow 360 of FIG. 3A, in accordance with various embodiments. This view depicts two of the curved elongated liners 300 as first and second liners 300*a* and 300*b*, respectively, the lock stud 120 and the hub 103. As mentioned, two liners of the same type can be provided in the handle, one on each side of the tang. The lock stud and hub extend through the liners and can be slightly longer than the spacing sp between the liners. The liners are spaced apart from one another by sp. The lock stud may extend outward from the liner to allow a user to operate it with their thumb when closing the blade. The hub may be secured to the liners while the lock stud protrudes past the liners and can move frontward and rearward with minimal friction.

FIG. 3C depicts a perspective view of the liner 300 of FIG. 3A, showing a cross-sectional thickness (Th), in accordance with various embodiments. As mentioned, in one possible approach, the spring can be stamped out of the same sheet metal as the body of the liner, so that the spring and body of the liner have the same thickness. The width (w) of the spring is also depicted. Alternatively, the thickness of the spring and liner body and be different.

FIG. 4 is a side view of a portion of an example liner 370 similar to the liner 300 of FIG. 3A, but where the liner includes an opening 380, in accordance with various embodiments. As mentioned, the cutout region 390 of the liner can extend to the outer perimeter of the liner and doesn't need to be enclosed around the spring. This approach can allow for reduced weight and provide space for design variations. The spring has a bend point 450, which refers to a point on the spring in which there is a local minimum in the bend radius.

A number of example design requirements can be set for the spring. For example, regarding stress, a requirement may be made that the liner can withstand 100 k open-close cycles without taking a set, and withstand one open-close cycle during assembly without taking a set. Taking a set refers to the spring arm being stressed to the point that permanent plastic deformation occurs. An example material for the liner is a metal such as 410SS with heat treatment. This refers to Alloy 410 (UNS S41000), a 12% chromium martensitic stainless steel plate. Although, many other materials are possible. In one approach, the metal is a sheet metal. Moreover, when the spring is formed separately from the liner, the spring can be made of a different material than the liner.

An example yield strength of 186 kilo pounds per square inch (ksi) (1,282 MPa) was used as limit in finite element analysis studies of the apparatus with the 410SS metal. A 216 ksi (1,489 MPa) ultimate strength was also used.

Another example design requirement involves the displacement/total stroke length. For example, the lock stud total travel: this is tang displacement plus a minimum of 0.015" clearance. An example stroke length is 0.1028" (0.0678" stroke for lock engagement+0.020" diameter increase for suck back+0.015" min bonus clearance). Suck back refers to the action of the spring in biasing the blade toward the closed position. Note that other axis lock designs had a stroke length of about 0.200" total (longer stroke, more excess travel afterwards/bonus clearance). A greater stroke length may be required for optimal suck back.

Regarding the spring rate, also known as the spring constant, a lower value is better to create a similar feeling at lock load and max load. An example typical target is 10 lbs/in (1751 N/m) total or 5 lbs/in (875 N/m) per liner. The spring rate is typically discussed as a total based on the use of two liners in a knife handle. The spring rates in this document follow this convention.

Regarding design requirements for forces, one approach is to start with about a 1.0 lb (44.4 N) lock load target. This can be increased if desired. The CLR (due to spring design and total stroke length) is ideally less than 1.0 lb (44.4 N), in one approach. With the lock load target and CLR set, the max load can then be tuned as desired within an acceptable stress range. Typically, the force is 0.15 lb (0.67 N) per liner (0.3 lb or 1.33 N total) at a minimum at the lock load state.

Other desired design requirements include corrosion resistance, ease of assembly, reasonable manufacturing/processing cost, the ability for the lock stud to move along the slot without excessive friction, and ensuring that the lock stud cannot fall below the top edge of the slot or liner opening. That is, the lock stud should be held against the top wall/edge of the cutout region of the liner by the shoe of the spring.

FIG. 5 depicts an example liner design 500 in which the spring 510 is a separate piece which is attached to the liner 540, in accordance with various embodiments. Instead of integrating the spring with the liner as a single piece, the spring can be stamped from a metal sheet separate from the stamping of the liner. The spring is then installed with a tight fit into the liner, e.g., in a friction fit or press fit, or otherwise attached to the liner. This can provide advantages such as allowing the spring to be formed of a different material than the liner and/or to have a different thickness than the liner. The different material and/or thickness can be designed to optimize the characteristics of the spring such as in terms of spring constant and endurance. Additionally, it can be easier to stamp the spring and liner separately.

Potentially, the spring could be replaced after the knife is manufactured such as for a repair or to allow the user to customize the characteristics of the knife. For example, a user may desire to have a greater or lesser force when opening and closing the blade by installing a spring with a greater or lesser spring constant, respectively. The spring may be replaceable in this design.

The spring is elongated and curved in this example and has three bend points 550, 551 and 552.

The spring 510 includes an end portion 510*a* which is fit into a correspondingly shaped opening 541 in the liner at an origination point 555 of the spring. The spring also includes a free portion 510*b* which extends from the origination point to a free end. At the free end, a shoe 520, at its face, includes a groove or indentation 521 to hold the lock stud 120. The groove faces upwards so that the spring tends to keep the lock stud against the top wall 542 of the liner to prevent a clicking noise when the lock stud falls away from the top wall and then snaps back against the top wall. A stopper 530 is also depicted to limit rearward movement of the spring in the max load position. The spring is shown in the lock load position.

FIG. 6 depicts a chart showing a range of forces on an integral elongated spring, with a less preferred spring design, in accordance with various embodiments. Such a spring design has a relatively large CLR, few choices for achieving the desired force to bias the lock stud and the need to operate at or near a maximum stress capability of the spring. The chart shows that the lock load (LL) force (left hand bar extending from 0-0.9 lb or 0-4.0 N) is about 0.9 lb (4.0 N), the CLR force is about 1.7 lb or 7.5 N (middle bar extending from 0.9-2.6 lb or 4.0-11.5 N) and the remaining max stress (MS) margin is only about 0.1 lb or 0.44 N (right hand bar extending from 2.6-2.7 lb or 11.5-12.0 N).

FIG. 7 depicts a chart showing a range of forces on an integral elongated spring, with a more preferred spring design, in accordance with various embodiments. A good spring design has a relatively small CLR, many choices for achieving the desired force to bias the lock stud and avoids the need to operate at or near a maximum stress capability of the spring. The chart shows that the lock load force (left hand bar extending from 0-1.0 lb or 0-4.4 N) is about 1.0 lb (4.4 N), the CLR force is about 0.8 lb or 3.5 N (middle bar extending from 1.0-1.8 lb or 4.4-8.0 N) and the remaining max stress margin is about 0.5 lb or 2.2 N (right hand bar extending from 1.8-2.3 lb or 8.0-10.2 N). The force of the spring on the lock stud is thus 1.0 lb (4.4 N) in the lock load position of the spring, and 1.8 lb (8.0 N) in the max load position of the spring. The spring can be designed to set the lock load force or the max load force at a desired level. The max stress margin represents an optional load range.

A design process can proceed as follows. First, start with a lock load target of about 1.00 lb (4.4 N). Second, aim to minimize CLR, e.g., by minimizing the cross sectional area of lever arm, maximizing the lever arm vertical length and total arc length, and minimizing the stroke such as through blade tang design. Third, make adjustments to the above if the stress at max load is over the stress limit (e.g., 186 ksi or 1,282 MPa). The lock load target may have to be increased for heavy blades to achieve the desired suck back to the closed position.

FIG. 8A depicts a side view of a liner 800 where a J-shaped spring 805 has a stopper 810, in accordance with various embodiments. As noted, it is good to have a stopper to limit the maximum deflection of the spring. The stopper allows for the maximum displacement, but no more, so that it doesn't take a set during assembly, e.g., the spring arm is not stressed to the point that permanent plastic deformation occurs and, instead, the spring arm is able to bend back to its original shape. The stopper is on the back side of the shoe, in this example. In other examples, the stopper is part of the liner such as with the stopper 320 of FIG. 3A.

FIG. 8B depicts a side view of the liner 800 of FIG. 8A at the time of manufacture, where a tab 820 is added for stability, in accordance with various embodiments. The tab can be stamped into a metal sheet with the spring. The tab secures the spring during manufacture and is subsequently removed, e.g., by cutting.

FIG. 9 depicts the liner 800 of FIG. 8A where the spring is in a lock load position and a max load position, in accordance with various embodiments. The stopper 810 is on the back side (facing the rear end of the handle) of the J-shaped spring 805 instead of being on the rear wall of the liner. The lock load position is represented by the spring 805 and the lock stud 120, and the max load position is represented by the spring 805*a* and the lock stud 120*r*.

The flat shoe face 910, 930 helps keep the lock stud against the top wall of the slot compared to the concave shoe face of FIG. 3A. With the flat shoe face, the lock stud rolls up the shoe face as the lock stud moves rearward. This holds the lock stud against the top surface of the slot. This design also yields a greater lock stud movement relative to the amount of spring deflection, giving a "softer" spring constant without adding stress to the spring.

Additionally, the liner is shaped with material 920 in the upper right corner of the opening to prevent the lock stud from slipping past the shoe.

In contrast, the design of FIG. 3A could result in a clicking sound as the lock stud sits on the concave face of the shoe and can pull away from the top wall of the liner as the shoe is pulled back, and then jump back up to hit the wall.

FIG. 10 is a side view of a tang 1000 with a hook in the knife of FIG. 2, in accordance with various embodiments. In this tang design, the hook 1001 may have a tendency to trap or hook the lock stud 120. This contributes to pulling the lock stud away from the top wall of the slot, leading to a potentially undesirable clicking sound when the knife is in use.

FIG. 11 is a side view of a tang 1100 without a hook in the knife of FIG. 2, in accordance with various embodiments. This is a modified blade tang design which can resolve the clicking issue of FIG. 10 by rounding off the point of the hook to provide a rounded region 1101.

FIG. 12A depicts the liner 800 of FIG. 8A, showing various features, in accordance with various embodiments. The radius of the spring, also referred to as the bend radius, varies at different points along the spring. FIG. 12A shows different bend radii r1-r3 at three example points. The radius is shorter when the bend is tighter and longer when the bend radius is more gradual. r1 is the radius at the origination point of the spring. The spring will have a minimum bend radius at some point along its length. In some cases, the minimum bend radius is at or near the bottom of the spring. At the minimum bend radius, the stress is concentrated and this is what drives the spring constant and stress. Some springs have a relatively constant bend radius throughout the majority of the length, and some have one primary bend region with a constant radius, with an intentionally small bend radius in one area to encourage a local bending point. In all of these cases, the minimum bend radius is still what matters.

The origin of the spring refers to a point on the shoe face which contacts the lock stud. This may be the center of the shoe face, for example. The shoe is at a free end (FE) of the spring. A rearward side of the shoe comprises a protruding stopper (PS). The shoe angle is the angle of the shoe face relative to the vertical, in a clockwise direction from the vertical. The horizontal is taken as a direction parallel to the longitudinal axis (LA) (see FIG. 1) of the knife handle, for example, which extends along a length of the knife handle, and the vertical (y-axis) is taken as a direction perpendicular to the horizontal direction (x-axis) and to the longitudinal axis. The origination point vertical offset is the vertical distance between the origination point of the spring and the origin of the shoe face. The origination angle (OA) is the angle of a straight line drawn between the origination point of the spring and the origin of the shoe face, relative to the vertical, in the clockwise direction in this figure. In this example, the origination angle is about 230 degrees, e.g., greater than 225 degrees. The number of bends of the spring in this example is one. In other examples, the spring has multiple bends in opposing directions. See, e.g., the liner design 1620 of FIG. 16. The origination point horizontal offset is the horizontal distance between the origination point 1201 of the spring and the origin 1202 of the shoe face.

FIG. 12B depicts the liner 800 of FIG. 8A, showing various features, in accordance with various embodiments. The total vertical height of the spring is the vertical distance between a bottommost point (BP) of the spring and the origin of the shoe face. The total horizontal width of the spring is the horizontal distance between the origination point and the furthest rearward point (rp) of the spring. The total spring arc length (AL) is the distance along the spring from the origination point to the shoe face origin.

A few observations can be made regarding optimizing the spring and liner. First, a thinner and narrower spring has a lower spring constant, as well as a lower stress at the maximum load position, which is desirable. The spring constant is a strong function of the lever arm thickness and width. Decreasing width reduces stress, while changing the thickness does not affect the stress. One approach is to use a minimum spring thickness and width, as these optimize CLR at a low level while also reducing stress, unless there is another reason to increase thickness and/or width. The minimum spring thickness and width is based on the raw sheet material thickness.

Another observation is that a softer (more gradual) bend point of the spring results in a smaller CLR with similar stress, while a sharper (less gradual) bend point of the spring results in a smaller CLR but higher stress. The optimal spring shape will depend on the form factor of the knife. In some cases, a minimum bend radius in a range of about 2 mm (0.08") to about 5 mm (0.20") works well. Note that the bend radius can vary along the spring so that the minimum bend radius is the sharpest bend point along the arc length of the spring. Thus, providing a tighter bend point results in a lower spring constant, although stress increases.

Another observation is that a higher origination point of the spring and a greater arc length of the spring contribute to lowering the spring constant.

Another observation is that a greater vertical height significantly reduces the spring constant. In fact, increasing the vertical height of the spring is the single greatest factor to reduce the spring constant. The effect of the vertical height is greater than the effect of the origination point in reducing the spring constant. Although, if the greater vertical height results in a minimum bend radius that is too flat (too large), the spring constant may be increased. See the liner designs in FIG. 14, for example.

The following discussion involves test data for a J-shaped spring.

In FIG. 13A-13J, the circled points denote a liner/spring thickness of 0.040" (1.016 mm) and a spring width of 0.025" (0.635 mm), and the other points denote a liner/spring thickness of 0.050" (1.270 mm) and a spring width of 0.030"

(0.762 mm). The spring constant is in units of pounds per inch or N/m. The length dimensions are in units of inches or mm.

FIG. 13A depicts a plot of spring constant versus total spring vertical height for various liner designs, in accordance with various embodiments. The data shows there is a very strong correlation between the spring vertical height and the spring constant. In particular, the spring constant decreases as the vertical height increases.

The outlier points 1300 result from flat bend radii and origination angles closer to 180 degrees.

The spring constant ranges from 5-19 lb/in or 3327 N/m and the total vertical height ranges from 0.400-1.200 in or 10-30 mm.

FIG. 13B depicts a plot of spring constant versus total spring horizontal width for various liner designs, in accordance with various embodiments. There is a slight but not strong correlation between the horizontal width and the spring constant. In particular, the spring constant decreases as the horizontal width increases.

The spring constant ranges from 5-19 lb/in or 875-3327 N/m and the horizontal width ranges from 0.300-0.750 in or 7.6-19 mm.

FIG. 13C depicts a plot of spring constant versus total spring arc length for various liner designs, in accordance with various embodiments. There is a very strong correlation between the arc length and the spring constant. In particular, the spring constant decreases as the arc length increases. An outlier point 1310 results from a short vertical height.

The spring constant ranges from 5-19 lb/in or 875-3327 N/m and the total arc length ranges from 0.600-2.000 in or 15-51 mm.

FIG. 13D depicts a plot of spring constant versus minimum bend radius for various liner designs, in accordance with various embodiments. There is a strong correlation between minimum bend radius and spring constant. In particular, the spring constant decreases as the bend radius decreases. The point 1320 demonstrates how the vertical height drives the difference between springs with the same minimum bend radius. The points 1325 have a better performance as they have a very tall vertical height which outweighs the flatter bend radius.

The spring constant ranges from 5-19 lb/in or 875-3327 N/m and the bend radius ranges from 0.000-1.000 in or 0-25 mm.

FIG. 13E depicts a plot of spring constant versus distance from origination point to shoe for various liner designs, in accordance with various embodiments. There is no correlation, indicating the distance is not an important variable.

The spring constant ranges from 5-19 lb/in or 875-3327 N/m and the distance ranges from 0.400-1.200 in or 10-30 mm.

FIG. 13F depicts a plot of spring constant versus origination angle for various liner designs, in accordance with various embodiments. There is a correlation between the origination angle and the spring constant. In particular, the spring constant decreases as the origination angle increases. The outliers 1330 and 1335 are due to another key variable being in a bad spot, e.g., these two points represent a very short spring vertical height.

The spring constant ranges from 5-19 lb/in or 875-3327 N/m and the origination angle ranges from 180-250 degrees.

FIG. 13G depicts a plot of spring constant versus origination point horizontal offset for various liner designs, in accordance with various embodiments. There is a slight but not strong correlation between the origination point horizontal offset and the spring constant. In particular, the spring constant decreases as the origination point horizontal offset increases.

The spring constant ranges from 5-19 lb/in or 875-3327 N/m and the horizontal offset ranges from 0.200-0.700 in or 5-18 mm.

FIG. 13H depicts a plot of spring constant versus origination point vertical offset for various liner designs, in accordance with various embodiments. There is no correlation, indicating the origination point vertical offset is not an important variable.

The spring constant ranges from 5-19 lb/in or 875-3327 N/m and the vertical offset ranges from 0.100-1.100 in or 3-28 mm.

FIG. 13I depicts a plot of a ratio of spring vertical height to total liner vertical height versus spring constant for an example liner, in accordance with various embodiments. There is a strong correlation between the ratio and the spring constant. In particular, the spring constant decreases as the ratio increases. Generally, a ratio of greater than 0.4 is good for a low spring constant. Above 0.5 is even better. There is no upper limit; the higher the ratio the better. The total vertical height represents the greatest vertical extent of the liner, where the vertical direction is perpendicular to the longitudinal axis, in one approach.

In an example implementation, a ratio of a vertical height of the curved elongated spring to a vertical height of the liner is at least 0.4 or 0.5.

The spring constant ranges from 5-30 lb/in or 875-5253 N/m and the ratio ranges from 0.30-0.75.

FIG. 13J depicts a plot of a ratio of arc length to total liner vertical height versus spring constant for the example liner of FIG. 13I, in accordance with various embodiments. There is a strong correlation between the ratio and the spring constant. In particular, the spring constant decreases as the ratio increases. Generally, a ratio of greater than 0.5 is good for a low spring constant. Above 0.6 is even better. There is no upper limit; the higher the ratio the better.

In an example implementation, a ratio of an arc length of the curved elongated spring to a vertical height of the liner is at least 0.5 or 0.6.

The spring constant ranges from 5-30 lb/in or 875-5253 N/m and the ratio ranges from 0.40-1.20.

FIG. 13K depicts an example table of spring constants and stress values as a function of spring dimensions, in accordance with various embodiments. The data was obtained from springs with vertical heights of 0.53" (13 mm), 0.59" (15 mm), 1.00" (25 mm) and 1.08" (27 mm) and generalized to vertical heights of 0.5" (13 mm), 0.7" (18 mm), 0.9" (23 mm) and 1.1" (28 mm) in the table.

The first column depicts the spring dimensions in terms of thickness (th)×width (w) in inches (in.) and mm, the second-fifth columns depict the spring constant in lb/in and N/m for the different vertical heights, and the sixth-ninth columns depict the spring stress at a 0.150" (3.8 mm) displacement in ksi and MPa for the different vertical heights.

The liner thicknesses considered included 0.030" (0.762 mm), 0.040" (1.016 mm), 0.050" (1.270 mm), 0.060" (1.524 mm), and 0.070" (1.778 mm). These thicknesses refer to finished liner thicknesses, not raw material stock. The spring width was varied (from 0.020 to 0.040 inches, or 0.508 to 1.016 mm) along with liner thickness, since this is the typical manufacturing capability. An ideal spring constant range is 3.0-15.0 lbs/in (525-2626 N/m), for example.

The maximum stress allowed is 186 ksi or 1,282 MPa in this example. A constant 0.150" or 3.8 mm total displacement was used for stress calculation (max load position, including preload).

Generally, the spring constant is lower when the spring vertical height is greater, and greater when the thickness and width are greater. Also, the stress is lower when the spring vertical height is greater, and greater when the thickness and width are greater.

FIG. 13L depicts plots of spring constant as a function of liner thickness and spring vertical height, consistent with the table of FIG. 13K, in accordance with various embodiments. The plots 1350-1353 represent the spring vertical heights of 0.5" (13 mm), 0.7" (18 mm), 0.9" (23 mm) and 1.1" (28 mm), respectively. An ideal spring constant range is about 3-15 lbs/in (525-2626 N/m), about 2-25 lbs/in (350-4378 N/m) or about 5-20 lbs/in (875-3502 N/m), for example. Generally, liner thickness has as much effect on spring constant as vertical spring height, if not more. The shorter the spring, the more sensitive it is to liner thickness. All spring heights can get to a good spring constant given the correct liner thickness. However, not all spring thicknesses/widths can be manufactured in a practical manner, considering a theoretically possible range. The spring width was varied along with spring thickness as noted in the table of FIG. 13K.

FIG. 13M depicts a plot of stress as a function of liner thickness and spring vertical height, consistent with the table of FIG. 13K, in accordance with various embodiments. The plots 1360-1363 represent the spring vertical heights of 0.5" (13 mm), 0.7" (18 mm), 0.9" (23 mm) and 1.1" (28 mm), respectively. An ideal stress range is below 186 ksi or 1,282 MPa, for example. Generally, taller springs can get below the stress limit at any liner thickness. The sensitivity to liner thickness is about the same for all spring heights. However, as with the spring constant, not all spring thicknesses/widths can be manufactured in a practical manner, considering a theoretically possible range. The spring width was varied along with spring thickness.

FIG. 14 depicts example liner designs with different minimum bend radii, in accordance with various embodiments. As mentioned, a softer (more gradual) bend point of the spring results in a smaller CLR with similar stress, while a sharper (less gradual) bend point of the spring results in a smaller CLR but higher stress. The liner design 1400 has a minimum bend radius (MBR) of 4 mm (0.16") at a bend point 1401, which is within the guideline of about 2 mm (0.08") to about 5 mm (0.20"). The liner design 1410 has a relatively small or sharp minimum bend radius of 1.6 mm (0.06") at a bend point 1411, which is less than the guideline. This design can result in excessively high stress in the spring.

Also, as mentioned, a greater vertical height significantly reduces the spring constant. Although, if the bend radius is too flat, the spring constant may be increased. For example, the liner design 1420 has a relatively tall spring arm but the minimum bend radius is relatively large (16 mm or 0.63") at a bend point 1421 so that the spring constant is advantageously relatively low. The liner design 1430 has a very large minimum bend radius (23 mm or 0.90") at a bend point 1431, approaching flat, so that the spring constant is disadvantageously increased.

The liner designs 1440 and 1450 do not have a tight bend radius but are still good designs. The liner designs 1440 and 1450 have a minimum bend radius of 6.4 mm (0.25") and 7.9 mm (0.31"), respectively, at bend points 1441 and 1451, respectively. In some cases, a minimum bend radius of about 2 mm (0.08") to about 8 mm (0.31") can be used. A minimum bend radius of less than about 8 mm (0.31"), 10mm or 12 mm may be used. In some cases, the minimum bend radius is in a range of about 2 mm (0.08") to about 8 mm (0.31"), or in a range of about 2 mm (0.08") to about 10 mm (0.39"). These ranges are for folding knives which are sized to fit the typical user's hand.

For the liner designs 1400, 1410, 1420, 1440 and 1450, the spring is shown in the lock load and the max load positions. For the liner design 1430, the spring is shown in the lock load position.

FIG. 15 depicts example liner designs with different origination angles, in accordance with various embodiments. This is one of the most important shape variables. A relatively large origination angle (OA) such as greater than 180 degrees or at least greater than 90 degrees is typically desired. A relatively large horizontal offset is also typically desired. The horizontal offset may be defined as the horizontal distance (along the longitudinal length of the knife handle) between the origination point of the spring and the shoe of the spring, e.g., at the point at which the shoe face contacts the lock stud in the lock load position, as noted in FIG. 12A.

Recall that in the liner design 800 of FIG. 12A, the origination angle is greater than 225 degrees. In the liner design 1510, the origination angle is less than that of the liner design 800 but still greater than 180 degrees. In the liner design 1520, the origination angle is similar to that of the liner design 1510. Additionally, the horizontal offset is greater than that in the liner designs 800 and 1510. The liner design 1530 has an origination angle which is less than that of the liner designs 800, 1510 and 1520 but still greater than 180 degrees.

A few conclusions can be drawn at this point. First, combining good vertical height, arc length, bend radii, and origination angles are all additively good. Second, a spring with otherwise good characteristics can be ruined if one of the variables is bad. Third, the width and thickness of the lever arm material have a very strong effect on the spring constant. Fourth, the most important shape variables are total vertical height and total arc length. The next most important shape variables are bend radius and origination angle.

FIG. 16 depicts example liner designs, in accordance with various embodiments. The liner design 1600 has a J-shaped spring 1601 in a liner 1602, and has a good X displacement, but with some Y displacement. It takes up the smallest space, and is easiest to manufacture. Additionally, a forward region 1603 of the liner cutout 1605 has a height which is slightly greater (e.g., up to 10-25% greater) than the diameter of the lock stud to guide the forward and rearward movement of the lock stud. The spring 1601 is shown in the lock load position.

The X displacement refers to the movement of the shoe in the x or horizontal direction and the Y displacement refers to movement of the shoe in the y or vertical direction, when comparing the lock load and max load positions of the spring. The horizontal movement is desirable as it allow the lock stud to move rearward while the vertical movement can be less desirable as the lock stud can move away from the top liner wall and snap back, as discussed previously.

The liner design 1610 has good X displacement, and essentially no Y displacement. It takes up more space than the liner design 1600 in the X direction. The spring is shown in the lock load position 1611 and the max load position 1612. The displacement of the shoe 1611*a* between the two positions is advantageously essentially limited to the horizontal direction, which is the direction of movement of the lock stud. Additionally, there is no added friction. However, this design requires a larger liner body and cutout.

The liner design 1620 has the most X displacement, compared to the liner designs 1600 and 1610, and essentially no Y displacement, although it can be more difficult to manufacture and takes up more space. The spring is shown in the lock load position 1621 and the max load position 1622. The spring has moved out of the plane of the cutout in the max load position. The spring includes an additional bend 1623. The displacement of the shoe 1621*a* between the two positions is again essentially limited to the horizontal direction.

The liner design 1600 may be preferred over the other designs due to its compact shape.

Generally, as the height of the spring increases and the origination point is lower in the liner, there is advantageously more horizontal displacement and less vertical displacement of the shoe of the spring. In this case, the spring tends to keep the lock stud against the top wall of the liner to prevent a clicking noise.

Additionally, when the horizontal extent of the spring is relatively large (such as in the liner designs 1610 or 1620 compared to the liner design 1600), the shoe tends to move to the right and up when transitioning from the lock load position to the max load position. Also, there is a relatively larger horizontal displacement of the shoe and a relatively lower spring constant.

Similarly, when the horizontal extent of the spring is relatively small (such as in the liner design 1600 compared to the liner designs 1610 and 1620), the shoe tends to move to the right and down when transitioning from the lock load position to the max load position. Also, there is a relatively smaller horizontal displacement of the shoe and a relatively larger spring constant.

FIG. 17 depicts example liner designs which vary in efficiency, in accordance with various embodiments. This involves lessons learned regarding stress balancing. Generally, it is possible to obtain an increased x-displacement and a lower spring constant without increasing stress by distributing the stress over a larger number of bends and a greater distance in the spring. The liner designs 1700 and 1710 represent a relatively low efficiency since the number of bends and the length of the spring are relatively low. The liner designs 1720 and 1730 represent an intermediate efficiency since the number of bends and the length of the spring are intermediate, between relatively low and relatively high. The liner designs 1740 and 1750 represent a relatively high efficiency since the number of bends and the length of the spring are relatively high. Although, the spring effectiveness also depends on the origination point and the total horizontal width of the spring.

Some non-limiting examples of various embodiments are presented below.

Example 1 includes Example 1 includes a knife, comprising: a blade; and a handle attached to the blade, wherein the blade is rotatable about a pivot point in the handle, and the handle comprises: a slot in which a lock stud is to move in a frontward direction and a rearward direction; a liner; and a curved elongated spring, wherein the curved elongated spring extends from the liner at an origination point to a free end, and comprises a shoe at the free end to bias the lock stud in the frontward direction.

Example 2 includes the knife of Example 1, wherein the curved elongated spring is vertically oriented, having a height greater than a total horizontal width.

Example 3 includes the knife of Example 1 or 2, wherein the lock stud is in contact with a tang of the blade, the tang comprises a flat surface which the lock stud is in contact with when the blade is in an open position to lock the blade in the open position and a rounded surface which the lock stud is in contact with when the blade transitions between the open position and a closed position to allow the blade to transition between the open and closed positions.

Example 4 includes the knife of any one of Examples 1-3, wherein the curved elongated spring has a spring constant of 3-15 lbs/in (525-2626 N/m), 2-25 lbs/in (350-4378 N/m) or 5-20 lbs/in (875-3502 N/m).

Example 5 includes the knife of any one of Examples 1-4, wherein a ratio of a vertical height of the curved elongated spring to a vertical height of the liner is at least 0.4 or 0.5.

Example 6 includes the knife of any one of Examples 1-5, wherein a ratio of an arc length of the curved elongated spring to a vertical height of the liner is at least or 0.6.

Example 7 includes the knife of any one of Examples 1-6, wherein the curved elongated spring is formed integrally in one piece with the liner.

Example 8 includes the knife of any one of Examples 1-7, wherein the curved elongated spring is a separate piece which is attached to the liner.

Example 9 includes the knife of any one of Examples 1-8, wherein the origination point is frontward of the shoe and below the shoe.

Example 10 includes the knife of any one of Examples 1-9, wherein the shoe has a flat face to engage the lock stud.

Example 11 includes the knife of any one of Examples 1-10, wherein a rearward side of the shoe comprises a protruding stopper.

Example 12 includes the knife of any one of Examples 1-11, wherein the liner is a first liner of the knife, the knife further comprises a second liner, the first and second liners are on opposite sides of a tang of the blade, and the second liner comprises a curved elongated spring to bias the lock stud in the frontward direction.

Example 13 includes the knife of any one of Examples 1-12, wherein the curved elongated spring is J-shaped.

Example 14 includes a liner for a knife, comprising: a body comprising sheet metal; and a curved elongated spring extending in a cutout region of the body, starting at an origination point and extending to a shoe at a free end of the elongated spring.

Example 15 includes the liner of Example 14, wherein the shoe is to bias a lock stud of the knife in a frontward direction of the knife.

Example 16 includes the liner of Example 14 or 15, wherein the curved elongated spring is formed from the sheet metal in one piece with the body.

Example 17 includes the liner of any one of Examples 14-16, wherein the curved elongated spring is a separate piece which is attached to the body.

Example 18 includes the liner of any one of Examples 14-17, wherein the curved elongated spring has a minimum bend radius in a range of about 2 mm (0.08") to about 10 mm (0.39").

Example 19 includes the liner of any one of Examples 14-18, wherein the curved elongated spring is J-shaped.

Example 20 includes the liner of any one of Examples 14-19, wherein the origination point is frontward of the shoe and below the shoe.

Example 21 includes the liner of any one of Examples 14-20, wherein the curved elongated spring has a spring constant of about 3-15 lbs/in (525-2626 N/m), 2-25 lbs/in (350-4378 N/m) or 5-20 lbs/in (875-3502 N/m).

Example 22 includes the liner of any one of Examples 14-21, wherein a ratio of a vertical height of the curved elongated spring to a vertical height of the liner is at least 0.4 or 0.5, and a ratio of an arc length of the curved elongated spring to a vertical height of the liner is at least 0.5 or 0.6.

Example 23 includes the liner of any one of Examples 14-22, wherein the curved elongated spring is vertically oriented, having a height greater than a total horizontal width.

Example 24 includes a knife, comprising: a blade; and a handle attached to the blade, wherein the blade is rotatable about a pivot point in the handle, and the handle comprises: first and second liners spaced apart from one another, wherein each respective liner comprises a slot for a lock stud, each respective liner comprises a curved elongated spring, and for each respective liner, the curved elongated spring extends from the liner at an origination point to a free end, and comprises a shoe at the free end to bias the lock stud in a frontward direction to lock the blade in an open position.

Example 25 includes the knife of Example 24, wherein for each respective liner, the curved elongated spring is vertically oriented, having a height greater than a total horizontal width.

Example 26 includes the knife of Example 24 or 25, wherein the curved elongated spring is formed integrally in one piece with the liner.

Example 27 includes the knife of any one of Examples 24-26, wherein the curved elongated spring is a separate piece which is attached to the liner.

Example 28 includes the knife of any one of Examples 24-27, wherein the origination point is frontward of the shoe and below the shoe.

Example 29 includes the knife of any one of Examples 24-28, wherein the shoe has a flat face to engage the lock stud.

Example 30 includes the knife of any one of Examples 24-29, wherein the curved elongated spring is J-shaped.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

The invention claimed is:

1. A knife, comprising:

a blade comprising a tip; and a handle attached to the blade, wherein the blade is rotatable about a pivot point in the handle between an open position and a closed position, and the handle comprises:

a slot in which a lock stud is to move in a frontward direction and a rearward direction, opposite the frontward direction, and wherein the frontward direction is toward the tip when the blade is in the open position;

a liner; and a curved elongated spring, wherein the curved elongated spring extends from the liner at an origination point to a free end, and comprises a shoe at the free end to bias the lock stud in the frontward direction, wherein the knife has a longitudinal axis and a vertical axis that is perpendicular to the longitudinal axis, the origination point is frontward of, and below, the pivot point, and the free end is rearward of, and above, the pivot point.

2. The knife of claim 1, wherein the curved elongated spring is vertically oriented, having a height greater than a total horizontal width.

3. The knife of claim 1, wherein the lock stud is in contact with a tang of the blade, the tang comprises a flat surface which the lock stud is in contact with when the blade is in an open position to lock the blade in the open position and a rounded surface which the lock stud is in contact with when the blade transitions between the open position and a closed position to allow the blade to transition between the open and closed positions.

4. The knife of claim 1, wherein the curved elongated spring is formed integrally in one piece with the liner.

5. The knife of claim 1, wherein the curved elongated spring is a separate piece which is attached to the liner, and the curved elongated spring comprises an end portion that is press fit into a correspondingly shaped opening in the liner at the origination point.

6. The knife of claim 1, wherein the shoe has a flat face to engage the lock stud, and the lock stud is configured to move relative to the flat face as the lock stud moves in the rearward direction.

7. The knife of claim 1, wherein the longitudinal axis is parallel to the frontward direction.

8. A liner for a knife, comprising:

a body comprising sheet metal; and a curved elongated spring extending in a cutout region of the body, starting at an origination point and extending to a shoe at a free end of the elongated spring, wherein the curved elongated spring comprises an end portion that is press fit into a correspondingly shaped opening in the liner at the origination point.

9. The liner of claim 8, wherein:

the liner comprises an opening for a hub on which a tang of a blade is mounted;

the blade is rotatable about a pivot point between an open position and a closed position;

the shoe is to bias a lock stud of the knife in a frontward direction of the knife; and the frontward direction is toward a tip of the blade when the blade is in the open position.

10. The liner of claim 9, wherein:

the knife has a longitudinal axis, and a vertical axis that is perpendicular to the longitudinal axis;

the origination point is frontward of, and below, the pivot point; and the free end of the curved elongated spring is rearward of, and above, the pivot point.

11. The liner of claim 8, wherein the curved elongated spring has a minimum bend radius in a range of about 2 mm to about 10 mm.

12. The liner of claim 8, wherein the curved elongated spring is J-shaped.

13. The liner of claim 8, wherein:

the knife comprises a blade having a tip;

the blade is rotatable between an open position and a closed position; and the origination point is frontward of the shoe, toward the tip of the blade when the blade is in the open position, and below the shoe.

14. The liner of claim 8, wherein the curved elongated spring has a spring constant of 3-15 lbs/in (525-2626 N/m), 2-25 lbs/in (350-4378 N/m) or 5-20 lbs/in (875-3502 N/m).

15. The liner of claim 8, wherein a ratio of a vertical height of the curved elongated spring to a vertical height of the liner is at least 0.4 or 0.5, and a ratio of an arc length of the curved elongated spring to a vertical height of the liner is at least 0.5 or 0.6.

16. The liner of claim 8, wherein the curved elongated spring is vertically oriented, having a height greater than a total horizontal width.

17. A knife, comprising:

a blade comprising a tip; and a handle attached to the blade, wherein the blade is rotatable about a pivot point in the handle between an open position and a closed position, the knife has a longitudinal axis and a vertical axis that is perpendicular to the longitudinal axis, and the handle comprises:

a slot for a lock stud;

a liner comprising a cutout region having a top wall; and a curved elongated spring that extends from the liner in the cutout region, wherein the curved elongated spring extends from at an origination point to a free end, and comprises a shoe at the free end to bias the lock stud in a frontward direction to lock the blade in the open position, the frontward direction is toward the tip when the blade is in the open position, and the shoe has a flat face to bias the lock stud against the top wall when the lock stud moves in a rearward direction, opposite the frontward direction.

18. The knife of claim 17, wherein for each respective liner, the curved elongated spring is vertically oriented, having a height greater than a total horizontal width.

19. The knife of claim 17, wherein:

the knife has a longitudinal axis, and a vertical axis that is perpendicular to the longitudinal axis;

the origination point is frontward of, and below, the pivot point; and the free end of the curved elongated spring is rearward of, and above, the pivot point.

20. A knife, comprising:

a blade comprising a tip; and a handle attached to the blade, wherein the blade is rotatable about a pivot point in the handle between an open position and a closed position, and the handle comprises:

a slot in which a lock stud is to move in a frontward direction and a rearward direction, opposite the frontward direction, wherein the frontward direction is toward the tip when the blade is in the open position;

a liner; and a curved elongated spring, wherein the curved elongated spring extends from the liner at an origination point to a free end, and comprises a shoe at the free end to bias the lock stud in the frontward direction and wherein a rearward side of the shoe comprises a protruding stopper.

* * * * *